United States Patent
Wynne et al.

(10) Patent No.: US 11,305,520 B2
(45) Date of Patent: Apr. 19, 2022

(54) HIGH-SHRINK, HIGH-STRENGTH MULTILAYER FILM

(71) Applicant: Cryovac, LLC, Charlotte, NC (US)

(72) Inventors: Ashley Wynne, Woodruff, SC (US);
Kelly Ahlgren, Greenville, SC (US);
Miles Johnston, Tega Cay, SC (US);
Rebecca Kersey, Greenville, SC (US)

(73) Assignee: Cryovac, LLC, Charlotte, NC (US)

( * ) Notice: Subject to any disclaimer, the term of this patent is extended or adjusted under 35 U.S.C. 154(b) by 87 days.

(21) Appl. No.: 16/604,090

(22) PCT Filed: Apr. 13, 2018

(86) PCT No.: PCT/US2018/027428
§ 371 (c)(1),
(2) Date: Oct. 9, 2019

(87) PCT Pub. No.: WO2018/191583
PCT Pub. Date: Oct. 18, 2018

(65) Prior Publication Data
US 2021/0101374 A1    Apr. 8, 2021

Related U.S. Application Data

(60) Provisional application No. 62/485,132, filed on Apr. 13, 2017.

(51) Int. Cl.
*B32B 27/08* (2006.01)
*B32B 7/028* (2019.01)
(Continued)

(52) U.S. Cl.
CPC .............. *B32B 27/08* (2013.01); *B32B 7/028* (2019.01); *B32B 27/18* (2013.01); *B32B 27/304* (2013.01);
(Continued)

(58) Field of Classification Search
CPC . B32B 27/08; B32B 267/00; B32B 2307/736; B32B 2307/7246;
(Continued)

(56) References Cited

U.S. PATENT DOCUMENTS 4,064,296 A    12/1977   Bornstein et al.
4,278,738 A     7/1981   Brax et al.
(Continued)

FOREIGN PATENT DOCUMENTS

CN    101754908    6/2010
EP    1574328 B1   9/2005
(Continued)

*Primary Examiner* — Michael C Miggins
(74) *Attorney, Agent, or Firm* — Jason R. Womer

(57) ABSTRACT

A multilayer, heat-shrinkable film has a first portion containing an outer heat seal layer and a second portion containing a PVDC barrier layer and a second outer layer comprising polyester. Both film portions comprise polymer networks which are strained by solid-state orientation, but only the first portion contains a crosslinked polymer network. The film has (i) a total free shrink at 85° C. of at least 90% and (ii) an instrumented impact energy-to-break of at least 0.0.65 J/mil and/or an instrumented impact peak load of at least 70 N/mil. The film is primarily made from ethylene-based polymers. Packaging articles can be made by sealing the film to itself. The film comprises no polyamide or polyamide in an amount up to 10 wt %, on a total film weight basis.

19 Claims, 13 Drawing Sheets

(51) Int. Cl.
    *B32B 27/18*     (2006.01)
    *B32B 27/30*     (2006.01)
    *B32B 27/32*     (2006.01)
    *B32B 27/36*     (2006.01)

(52) U.S. Cl.
    CPC ............ *B32B 27/306* (2013.01); *B32B 27/32* (2013.01); *B32B 27/36* (2013.01); *B32B 2250/03* (2013.01); *B32B 2250/05* (2013.01); *B32B 2250/24* (2013.01); *B32B 2307/31* (2013.01); *B32B 2307/54* (2013.01); *B32B 2307/558* (2013.01); *B32B 2307/7244* (2013.01); *B32B 2307/7246* (2013.01); *B32B 2307/736* (2013.01); *B32B 2323/046* (2013.01); *B32B 2327/00* (2013.01); *B32B 2331/00* (2013.01); *B32B 2367/00* (2013.01); *B32B 2439/06* (2013.01); *B32B 2439/70* (2013.01)

(58) Field of Classification Search
    CPC ...... B32B 2307/7244; B32B 2307/558; B32B 2307/54; B32B 2307/31; B32B 2250/05; B32B 2250/03; B32B 27/36; B32B 27/32; B32B 27/306; B32B 27/304; B32B 27/18; B32B 7/028
    See application file for complete search history.

(56) References Cited

U.S. PATENT DOCUMENTS

| | | |
|---|---|---|
| 5,206,075 A | 4/1993 | Hodgson |
| 5,241,031 A | 8/1993 | Mehta |
| 5,272,236 A | 12/1993 | Lai et al. |
| 5,278,272 A | 1/1994 | Lai et al. |
| 6,499,274 B1 | 12/2002 | McDonald et al. |
| 6,764,729 B2 | 7/2004 | Ramesh et al. |
| 6,970,468 B2 | 11/2005 | Doidge et al. |
| 2007/0031691 A1* | 2/2007 | Forloni .................. B32B 27/36 |
| | | 428/475.2 |
| 2008/0292225 A1 | 11/2008 | Dayrit et al. |
| 2008/0292821 A1* | 11/2008 | Dayrit .................... B32B 27/34 |
| | | 428/34.9 |

FOREIGN PATENT DOCUMENTS

| | | |
|---|---|---|
| GB | 2328673 A | 3/1999 |
| JP | 2011126581 | 6/2011 |
| WO | 90/03414 A1 | 4/1990 |
| WO | 93/03093 A1 | 2/1993 |

\* cited by examiner

HIGH-SHRINK, HIGH-STRENGTH MULTILAYER FILM

BACKGROUND

The present invention pertains to heat-shrinkable films having a high degree of heat shrinkability and a high strength per unit of thickness.

Heat-shrinkable packaging articles have been used for the packaging of a variety of products. Food, particularly meat, has been vacuum packaged in such packaging articles. These heat-shrinkable packaging articles have become tougher and easier to seal, with improved oxygen and moisture barrier properties, with higher total free shrink at lower temperatures.

Recently bags made from a heat-shrinkable film having an inside polyolefin-based heat seal layer in combination with an outside polyester layer, an internal oxygen-barrier layer comprising polyvinylidene chloride (PVDC), and one or more internal layers comprising polyamide. The outside polyester layer provides clarity, high gloss, and high tensile strength. The internal polyamide layer(s) provide the film with a high level of toughness and strength. However, polyamide is expensive relative to polyolefin. Moreover, the inclusion of enough polyamide to provide the film with enhanced strength and abuse resistance has also been found to cause the film to exhibit dimensional instability due to the hydroscopic nature of polyamides, i.e., water absorbed by the polyamide plasticizes the polyamide, causing the film to undergo shrinkage before the film was used for packaging.

SUMMARY

It has been discovered that the combination of high shrink and high film strength per unit thickness can be obtained in a film having a PVDC layer but little or no polyamide therein. The combination of high shrink and high strength is achieved by providing the film as a first portion having a crosslinked polymer network which has been strained by solid state orientation, and a second portion which has been oriented in the solid state but which does not comprise the crosslinked polymer network.

A first aspect is directed to a multilayer, heat-shrinkable film comprising a first film portion laminated to a second film portion. The first film portion comprises a first layer which is a first outer layer and which is a heat-seal layer, and the first film portion comprising a cross-linked polymer network which has been strained by solid-state orientation. The second film portion comprises (i) a second layer which is a second outer layer and which comprises polyester, and (ii) a third layer which is an oxygen barrier layer comprising polyvinylidene chloride. The third layer is between the first layer and the second layer. The third layer has no cross-linked-polymer network. The second film portion has a polymer network which has been strained by solid state orientation, but the second film portion does not contain a crosslinked polymer network. The film comprises 0 wt % polyamide or polyamide in an amount of less than 10 wt %, on a total film weight basis. The multilayer, heat-shrinkable film has a total free shrink at 85° C. of at least 90% measured in accordance with ASTM D2732. In an embodiment, the multilayer, heat-shrinkable film has (i) an instrumented impact energy-to-break of at least 0.65 J/mil, measured in accordance with ASTM D3763, and/or (ii) and an instrumented impact peak load strength of at least 70 Newtons/mil, measured in accordance with ASTM D3763, and/or (iii) a packaging article made by sealing the film to itself exhibits a Truburst strength of at least 8 psi.

In an embodiment, the polyester in the second outer layer makes up from 2 to 20 wt % based on total film weight, the polyvinylidene chloride in the oxygen barrier layer makes up from 2 to 20 wt % based on total film weight, and the film further comprises an ethylene-based polymer having a peak melting point ≥95° C. and at least one ethylene/unsaturated ester copolymer. The ethylene-based polymer making up from 30 to 80 wt %, based on total film weight, and the ethylene/unsaturated ester making up from 10 to 55 wt %, based on total film weight.

In an embodiment, the polyester in the second outer layer makes up from 2 to 10 wt % based on total film weight, and the polyvinylidene chloride in the oxygen barrier layer makes up from 5 to 15 wt % based on total film weight. The film further comprises an ethylene-based polymer having a peak melting point ≥95° C. and at least one ethylene/unsaturated ester copolymer. The ethylene-based polymer makes up from 40 to 70 wt %, based on total film weight, and the ethylene/unsaturated ester makes up from 25 to 45 wt %, based on total film weight.

In an embodiment, the polyester in the second outer layer makes up from 4 to 8 wt % based on total film weight, and the polyvinylidene chloride in the oxygen barrier layer makes up from 5 to 15 wt % based on total film weight. The film further comprises an ethylene-based polymer having a peak melting point ≥95° C. and at least one ethylene/unsaturated ester copolymer. The ethylene-based polymer makes up from 45 to 65 wt %, based on total film weight, and the ethylene/unsaturated ester makes up from 30 to 40 wt %, based on total film weight. The film does not comprise polyamide.

In an embodiment, the first film portion comprises an ethylene-based polymer having a peak melting point ≥95° C. and an ethylene/unsaturated ester copolymer. The ethylene-based polymer makes up from 60 to 95 wt %, based on weight of the first film portion, and the ethylene/unsaturated ester makes up from 5 to 40 wt %, based on weight of first film portion.

In an embodiment, the first film portion comprises an ethylene-based polymer having a peak melting point ≥95° C. and an ethylene/unsaturated ester copolymer. The ethylene-based polymer makes up from 70 to 95 wt %, based on weight of the first film portion, and the ethylene/unsaturated ester making up from 5 to 30 wt %, based on weight of first film portion.

In an embodiment, the multilayer, heat-shrinkable film according to claim 1, wherein the first film portion comprises an ethylene-based polymer having a peak melting point ≥95° C. and an ethylene/unsaturated ester copolymer. The ethylene-based polymer makes up from 80 to 90 wt %, based on weight of the first film portion. The ethylene/unsaturated ester copolymer makes up from 10 to 20 wt %, based on weight of first film portion. The film does not comprise polyamide.

In an embodiment, the polyester in the second outer layer makes up from 2 to 20 wt % based on total film weight, the polyvinylidene chloride in the oxygen barrier layer makes up from 2 to 20 wt % based on total film weight. The film further comprises an ethylene-based polymer having a peak melting point ≥95° C. The ethylene-based polymer making up from 30 to 80 wt %, based on total film weight, and from 60 to 95 wt % based on weight of the first film portion. The film further comprises at least one ethylene/unsaturated ester copolymer. The ethylene/unsaturated ester making up from 10 to 55 wt %, based on total film weight. The ethylene/unsaturated ester making up from 5 to 40 wt %, based on weight of first film portion.

In an embodiment, the polyester in the second outer layer makes up from 2 to 10 wt %, based on total film weight, and the polyvinylidene chloride in the oxygen barrier layer makes up from 5 to 15 wt %, based on total film weight. The film further comprises an ethylene-based polymer having a peak melting point ≥95° C. The ethylene-based polymer makes up from 40 to 70 wt %, based on total film weight, and from 70 to 95 wt % based on weight of the first film portion. The film further comprises at least one ethylene/unsaturated ester copolymer, the ethylene/unsaturated ester making up from 25 to 45 wt %, based on total film weight. The ethylene/unsaturated ester copolymer makes up from 5 to 30 wt %, based on weight of first film portion.

In an embodiment, the polyester in the second outer layer makes up from 4 to 8 wt %, based on total film weight, and the polyvinylidene chloride in the oxygen barrier layer makes up from 5 to 15 wt % based on total film weight. The film further comprises an ethylene-based polymer having a peak melting point ≥95° C. The ethylene-based polymer makes up from 45 to 65 wt %, based on total film weight, and from 80 to 90 wt %, based on weight of the first film portion. The film further comprises an ethylene/unsaturated ester which makes up from 30 to 40 wt %, based on total film weight. The ethylene/unsaturated ester makes up from 10 to 20 wt %, based on weight of first film portion.

In an embodiment, the polyester in the second outer layer makes up 6 wt %, based on total film weight, and the polyvinylidene chloride in the oxygen barrier layer makes up 10 wt %, based on total film weight. The film further comprises an ethylene-based polymer having a peak melting point ≥95° C. and at least one ethylene/unsaturated ester copolymer. The ethylene-based polymer makes up 50 wt %, based on total film weight, and the ethylene/unsaturated ester copolymer makes up 34 wt %, based on total film weight. The film does not comprise polyamide.

In an embodiment, the ethylene-based polymer is present in the first film portion in an amount of 85 wt %, based on weight of the first film portion, and the ethylene/unsaturated ester copolymer is present in the first film portion in an amount of 15 wt %, based on weight of first film portion.

In an embodiment, the first film portion comprises an ethylene-based polymer having a peak melting point ≥95° C. and an ethylene/unsaturated ester copolymer. The ethylene-based polymer makes up 85 wt %, based on weight of the first film portion, and the ethylene/unsaturated ester copolymer makes up 15 wt %, based on weight of first film portion. The film does not comprise polyamide.

In an embodiment, the heat seal layer comprises a blend of a homogeneous ethylene/alpha-olefin copolymer and a heterogeneous ethylene/alpha-olefin copolymer.

In an embodiment, the homogeneous ethylene/alpha-olefin copolymer is present in the heat seal layer in an amount of from 60 to 95 wt %, based on layer weight, and the heterogeneous ethylene/alpha-olefin copolymer is present in the heat seal layer in an amount of from 5 to 40 wt %, based on layer weight.

In an embodiment, the homogeneous ethylene/alpha-olefin copolymer is present in the heat seal layer in an amount of from 70 to 90 wt %, based on layer weight, and the heterogeneous ethylene/alpha-olefin copolymer is present in the heat seal layer in an amount of from 10 to 30 wt %, based on layer weight.

In an embodiment, the homogeneous ethylene/alpha-olefin copolymer is present in the heat seal layer in an amount of from 75 to 85 wt %, based on layer weight, and the heterogeneous ethylene/alpha-olefin copolymer is present in the heat seal layer in an amount of from 15 to 25 wt %, based on layer weight.

In an embodiment, the homogeneous ethylene/alpha-olefin copolymer is present in the heat seal layer in an amount of 80 wt %, based on layer weight, and the heterogeneous ethylene/alpha-olefin copolymer is present in the heat seal layer in an amount of 20 wt %, based on layer weight.

In an embodiment, the heterogeneous ethylene/alpha-olefin comprises at least one member selected from the group consisting of linear low density polyethylene and very low density polyethylene.

In an embodiment, the film further comprises a core layer in the first film portion, the core layer being between the heat seal layer and the oxygen barrier layer, the core layer comprising a blend of ethylene/unsaturated ester copolymer and at least one member selected from the group consisting of very low density polyethylene, ultra low density polyethylene, and homogeneous ethylene/alpha-olefin copolymer having a peak melting point of at least 95° C.

In an embodiment, the heat-shrinkable film further comprises: (i) a first tie layer between the oxygen barrier layer and the heat seal layer, the first tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer; (ii) a second tie layer between the oxygen barrier layer and the second outer layer comprising polyester, the second tie layer comprising at least one member selected from the group consisting of anhydride-functional polyolefin, anhydride-functional ethylene/unsaturated acid copolymer, anhydride-functional ethylene/unsaturated ester copolymer (particularly anhydride-functional ethylene/vinyl acetate copolymer and/or anhydride-functional ethylene/methyl acrylate copolymer), cyclic olefin copolymer (particularly ethylene/norbornene copolymer and/or ethylene/tetracyclododecene copolymer), acrylate-based polymer (particularly ethylene/methyl acrylate copolymer, ethylene/ethyl acrylate copolymer, and/or ethylene/butyl acrylate copolymer), polyurethane, styrene-based polymer (particularly styrene/maleic anhydride copolymer, anhydride-functional styrene-butadiene block copolymer, anhydride-functional styrene-ethylene-butylene-styrene copolymer, anhydride-functional styrene-butadiene-styrene copolymer, anhydride functional styrene-isoprene-styrene copolymer, anhydride-functional styrene-ethylene-butadiene-styrene copolymer, anhydride-functional grafted styrene-(ethylene-propylene rubber)-styrene, and/or polystyrene-poly(ethylene-propylene)-polystyrene copolymer).

In an embodiment, the heat-shrinkable film further comprises: (i) a first tie layer between the oxygen barrier layer and the core layer, with the first tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer, and (ii) a second tie layer between the oxygen barrier layer and the second outer layer comprising polyester, the second tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer.

In an embodiment, the heat-shrinkable film further comprises a third tie layer between the second tie layer and the second outer layer comprising polyester. The third tie layer comprises at least one member selected from the group consisting of anhydride-functional polyolefin, anhydride-functional ethylene/unsaturated acid copolymer, anhydride-functional ethylene/unsaturated ester copolymer (particularly anhydride-functional ethylene/vinyl acetate copolymer, and/or anhydride-functional ethylene/methyl acrylate copolymer), cyclic olefin copolymer (particularly ethylene/norbornene copolymer and/or ethylene/tetracyclododecene copolymer), acrylate-based polymer (particularly ethylene/methyl acrylate copolymer, ethylene/ethyl acrylate copolymer, and/or ethylene/butyl acrylate copolymer), polyurethane, styrene-based polymer (particularly styrene/maleic anhydride copolymer, anhydride-functional styrene-butadiene block copolymer, anhydride-functional styrene-ethylene-butylene-styrene copolymer, anhydride-functional styrene-butadiene-styrene copolymer, anhydride functional styrene-isoprene-styrene copolymer, anhydride-functional styrene-ethylene-butadiene-styrene copolymer, and anhydride-functional grafted styrene-(ethylene-propylene rubber)-styrene, and/or polystyrene-poly(ethylene-propylene)-polystyrene copolymer.)

In an embodiment, the crosslinked polymer network is present in the heat seal layer and the core layer, but the crosslinked polymer network is not present in the barrier layer, the second outer layer, and the first and second tie layers.

In an embodiment, the multilayer film further comprises a plastomer having a peak melting point ≤90° C. and a melt index of ≤1.1 g/10 min.

In an embodiment, the plastomer has a peak melting point ≤88° C., or a peak melting point ≤85° C., or a peak melting point ≤82° C., or a peak melting point ≤80° C., or a peak melting point of from 45° C. to 90° C., or a peak melting point of from 50° C. to 85° C., a peak melting point of from 55° C. to 85° C., or a peak melting point of from 45° C. to 80° C.

In an embodiment, the plastomer has a density ≤0.908 g/cc$^3$, or a density ≤0.905 g/cc$^3$, or a density ≤0.902 g/cc$^3$, or a density ≤0.900 g/cc$^3$, or a density ≤0.895 g/cc$^3$, or a density ≤0.890 g/cc$^3$, or ≤0.886 g/cm$^3$, or from 0.880 to 0.899 g/cm$^3$, or from 0.881 to 0.895 g/cm$^3$, or from 0.882 to 0.89 g/cm$^3$, or from 0.883 to 0.887 g/cm$^3$.

In an embodiment, the plastomer is present in the film in an amount of at least 2 wt %, based on total film weight, or at least 3.5 wt %, or at least 4 wt %, or at least 4.5 wt %, or at least 5 wt %, or at least 5.5 wt %, or at least 6 wt %, or at least 6.5 wt %, or at least 7 wt %, or at least 8 wt %, or at least 9 wt %, or at least 10 wt %, based on total film weight.

In an embodiment, the plastomer is present in the film in an amount of at least 4 wt %, based on total film weight; or in an amount of from 2 to 20 wt %, based on total film weight; or in an amount of from 3 to 15 wt %, based on total film weight; or in an amount of from 3 to 10 wt %, based on total film weight; or in an amount of from 4 to 8 wt %, based on total film weight; or in an amount of from 5 to 7 wt %, based on total film weight.

In an embodiment, the plastomer is present in the seal layer.

In an embodiment, the polyester comprises at least one member selected from the group consisting of polyethylene terephthalate homopolymer, polyethylene terephthalate copolymer (including polyethylene terephthalate glycol, PETG), polycyclohexane dimethylene terephthalate (PCT, and copolymers thereof, such as PCTG), polycyclohexanedimethanol terephthalic acid (PCTA, and copolymers thereof, such as PCTAG), polybutylene terephthalate homopolymer (PBT, and copolymers thereof, such as PBTG), polynaphthalene terephthalate homopolymer, polynaphthalene terephthalate copolymer, polyethylene furanoate homopolymer, and polyethylene furanoate copolymer.

In an embodiment, the polyester has a melting point of from 80° C. to 270° C., or from 200° C. to 270° C., or from 220° C. to 270° C., or from 240° C. to 270° C., or from 250° C. to 260° C.

In an embodiment, the crosslinked polymer network is present in every layer of the first film portion, and the crosslinked polymer network is not present in any layer of the second film portion.

In an embodiment, the film has a thickness of from 0.5 mil to 3 mils, or from 0.7 mil to 2.5 mils, or from 1 to 2 mils, or from 1.5 to 1.9 mils.

In an embodiment, the multilayer film has a total free shrink at 85° C. of at least 95%, or at least 100%, or at least 105%.

In an embodiment, the film has an instrumented impact energy-to-break ≥0.70 J/mil, or ≥0.75 J/mil, or ≥0.80 J/mil, or ≥0.85 J/mil.

In an embodiment, the film contains polyamide in an amount less than 30 wt % on a total film weight basis, or less than 20 wt %, or less than 15 wt %, or less than 10 wt %, or less than 5 wt %, or 0 wt % in which case the film does not contain polyamide.

In an embodiment, the film loses less than 5% total free shrink at 85° C. after exposure to 100% relative humidity for 24 hours at 32° C.; in another embodiment, the film loses less than 2% total free shrink at 85° C. after exposure to 100% relative humidity for 24 hours at 32° C.

In an embodiment, the film contains polyester in an amount of from 1 to 40 wt %, based on total film weight, or from 1 to 35 wt %, or from 1 to 25 wt %, from 1 to 20 wt %, based on total film weight, or from 1 to 15 wt %, based on total film weight, or from 1 to 10 wt %, based on total film weight.

A second aspect is directed to a multilayer, heat-shrinkable film comprising a first film portion laminated to a second film portion. The first film portion comprises a first layer which is a first outer layer and which is a heat-seal layer. The first film portion comprises a cross-linked polymer network which has been strained by solid-state orientation. The second film portion comprises a second layer which is a second outer layer and which comprises polyester, and a third layer which is an oxygen barrier layer comprising polyvinylidene chloride. The third layer is between the first layer and the second layer. The third layer has no crosslinked-polymer network. The second film portion has a polymer network which has been strained by solid state orientation, but the second film portion does not contain a crosslinked polymer network. The multilayer, heat-shrinkable film has a total free shrink at 85° C. of at least 90% measured in accordance with ASTM D2732, and an instrumented impact peak load strength of at least 70 Newtons/mil, measured in accordance with ASTM D3763. The film comprises 0 wt % polyamide or polyamide in an amount of less than 10 wt %, on a total film weight basis.

In an embodiment, the instrumented impact peak load strength of the multilayer film is at least 78 Newtons/mil, or at least 79 Newtons/mil, or at least 80 Newtons/mil, or at least 81 Newtons/mil.

A third aspect is directed to a packaging article comprising a multilayer, heat-shrinkable film comprising a first film portion laminated to a second film portion. The first film portion comprises a first layer which is a first outer layer and which is a heat-seal layer. The first film portion comprises a cross-linked polymer network which has been strained by solid-state orientation. The second film portion comprises a second layer which is a second outer layer comprising polyester, and a third layer which is an oxygen barrier layer comprising polyvinylidene chloride. The third layer is between the first layer and the second layer. The third layer has no crosslinked-polymer network. The second film portion has a polymer network which has been strained by solid state orientation. The second film portion does not contain a crosslinked polymer network. The multilayer film has a total free shrink at 85° C. of at least 90% measured in accordance with ASTM D2732, and an instrumented impact energy-to-break of at least 0.65 J/mil, measured in accordance with ASTM D3763. The film comprises 0 wt % polyamide or polyamide in an amount of less than 10 wt %, on a total film weight basis. The film is heat sealed to itself.

In an embodiment, the packaging article is an end-seal bag having an open top, a bottom seal, a folded first side edge, and a folded second side edge.

In an embodiment, the packaging article is a side-seal bag having an open top, a folded bottom edge, a first side seal, and a second side seal.

In an embodiment, the packaging article is a pouch having a bottom seal, a first side seal, and a second side seal.

In an embodiment, the packaging article is a form-fill-seal packaging article having a fin seal running the length of the article, a first end seal at a first end of the article, and a second end seal at the second end of the article, with the form-fill-seal packaging article enclosing a product therein.

In an embodiment, the packaging article has a patch adhered thereto, the patch comprising a patch film.

A fourth aspect is directed to a packaging article comprising a multilayer, heat-shrinkable film comprising a first film portion laminated to a second film portion. The first film portion comprises a first layer which is a first outer layer and which is a heat-seal layer. The first film portion comprising a cross-linked polymer network which has been strained by solid-state orientation. The second film portion comprises a second layer which is a second outer layer and which comprises polyester, and a third layer which is an oxygen barrier layer comprising polyvinylidene chloride. The third layer is between the first layer and the second layer. The third layer has no crosslinked-polymer network. The second film portion has a polymer network which has been strained by solid state orientation, but the second film portion does not contain a crosslinked polymer network. The multilayer, heat-shrinkable film has a total free shrink at 85° C. of at least 90% measured in accordance with ASTM D2732, and an instrumented impact peak load strength of at least 70 Newtons/mil, measured in accordance with ASTM D3763. The film comprises 0 wt % polyamide or polyamide in an amount of less than 10 wt %, on a total film weight basis. The film is heat sealed to itself.

In an embodiment, the packaging article is an end-seal bag having an open top, a bottom seal, a folded first side edge, and a folded second side edge.

In an embodiment, the packaging article is a side-seal bag having an open top, a folded bottom edge, a first side seal, and a second side seal.

In an embodiment, the packaging article is a pouch having a bottom seal, a first side seal, and a second side seal.

In an embodiment, the packaging article is a form-fill-seal packaging article having a fin seal running the length of the article, a first end seal at a first end of the article, and a second end seal at the second end of the article, with the form-fill-seal packaging article enclosing a product therein.

In an embodiment, the packaging article has a patch adhered thereto, the patch comprising a patch film.

A fifth aspect is directed to a process for making a multilayer, heat-shrinkable film comprising: (A) extruding a first film portion comprising a first layer which is a first outer layer which is a heat-seal layer; (B) quenching the first film portion; (C) irradiating the first film portion so that a crosslinked polymer network is formed in the first film portion; (D) extrusion-coating a second film portion onto the first film portion after the first film portion has been irradiated, the extrusion-coating resulting in a laminate of the first and second film portions, the second film portion comprising (d)(i) a second layer which is a second outer layer and which comprises polyester, the second outer layer being to serve as an outside layer of the packaging article, and (d)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer; (E) reheating the laminate to a temperature of from 88° C. to 100° C.; and (F) biaxially orienting the laminate in the solid state, resulting in the multilayer, heat-shrinkable film. The film comprises 0 wt % polyamide, or polyamide in an amount of less than 10 wt %, on a total film weight basis. The multilayer, heat-shrinkable film has a total free shrink at 85° C. of at least 90%, measured in accordance with ASTM D2732. In a first embodiment, the multilayer heat-shrinkable film has an instrumented impact energy-to-break of at least 0.65 J/mil, measured in accordance with ASTM D3763. In a second embodiment, the multilayer heat-shrinkable film has an instrumented impact peak load strength of at least 70 Newtons/mil, measured in accordance with ASTM D3763. A third embodiment, is directed to a packaging article (e.g., end seal bag, side seal bag, L-seal bag, pouch, backseamed bag with fin or lap seal, etc) comprising the film sealed to itself, the film having an instrumented impact energy-to-break of at least 0.65 J/mil, measured in accordance with ASTM D3763. A fourth embodiment is directed to a packaging article (e.g., end seal bag, side seal bag, L-seal bag, pouch, backseamed bag with fin or lap seal, etc) comprising the film sealed to itself, the film having an instrumented impact peak load strength of at least 70 Newtons/mil, measured in accordance with ASTM D3763.

The process of the fifth aspect can be carried out to make any of the films (and packaging articles) described in any of the aspects herein, including any embodiment of any of the first four aspects of the invention. More particularly, the fifth aspect can be carried out to make any of the films and packaging articles in accordance with the first aspect of the invention, any of the films and packaging articles in accordance with the second aspect of the invention, or any of the films and packaging articles in accordance with the third aspect of the invention, or any of the films and packaging articles in accordance with the fourth aspect of the invention.

In an embodiment, the first film portion is irradiated to a level of from 30 to 120 kGy.

In an embodiment, the oxygen barrier layer comprises polyvinylidene chloride.

In an embodiment, the first film portion is extruded from an annular extrusion die as a tubing and the second film portion is extruded over the tubing from an annular extrusion coating die, and the laminate is a tubular laminate.

In an embodiment, the biaxial orientation in the solid state is carried out by passing the tubular laminate over a trapped bubble while drawing the tubular laminate in the machine direction.

In an embodiment, the first film portion is extruded from a first flat die as a sheet and the second film portion is extruded from a second flat die as a coating over the sheet and the laminate is a flat laminate.

In an embodiment, the biaxial orientation in the solid state is carried out by drawing the flat laminate in a tenter frame.

In an embodiment, the laminate is biaxially oriented to a total orientation of from 10× to 16×.

DETAILED DESCRIPTION

Figure 1:
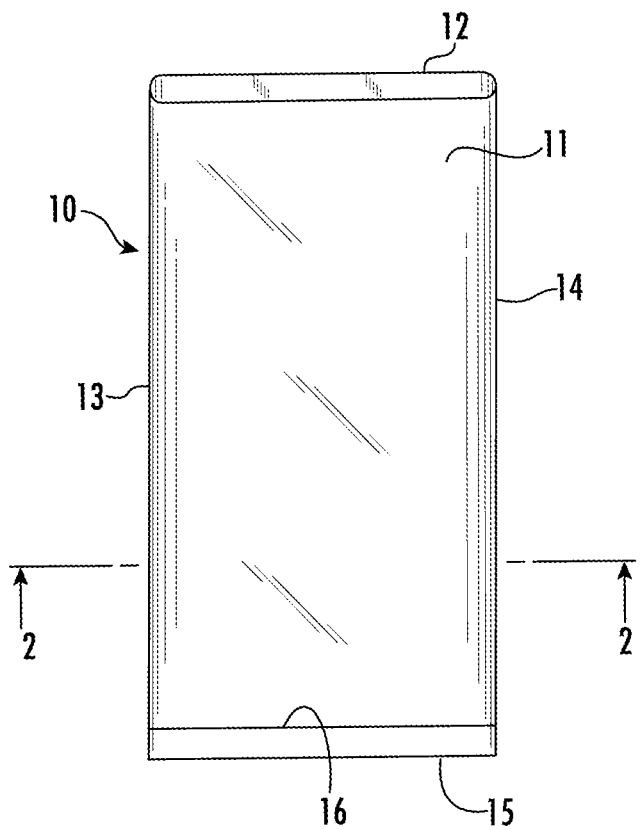
FIG. 1 is a schematic plan view of an end-seal bag.

As used herein, the term "film" is inclusive of plastic web, regardless of whether it is film or sheet. The film can have a total thickness, before shrinking, of 0.25 mm or less, or a thickness of from 0.5 to 10 mils, or from 0.7 to 5 mils, or from 0.8 to 4 mils, or from 1 to 3 mils, or from 1.2 to 2.5 mils, or from 1.4 to 2 mils. Alternatively, the film can have a thickness, before shrinking, of from 0.7 to 2.5 mils, or from 0.7 to 2.2 mils, or from 0.7 to 1.7 mils.

As used herein, the term "laminated" is used with reference to two film portions which are affixed to one another by coextrusion, extrusion coating, heat lamination, adhesive lamination, corona treatment, or any other means for fastening a principal surface of a first film to a principal surface of a second film.

As used herein, the phrase "film portion" is used with reference to one or more layers of a multilayer film, but less than all the layers of the multilayer film. For example, in the extrusion-coated film structure "A/B//C/D/E," wherein each letter represents a film layer and "/" represents a boundary between coextruded layers and "//" represents the boundary between the substrate portion (A/B, in this example) and the coating portion ("C/D/E" in this example), the substrate portion can be designated as a first film portion and the coating portion can be designated as a second film portion. The coextrusion of the various layers, as well as the extrusion coating of the two film portions, results in heat lamination of the layers to one another.

As used herein, the phrase "machine direction" refers to the direction in which the film emerges from the die, i.e., the direction the extrudate is forwarded during the film production process. The phrase "machine direction" corresponds with "longitudinal direction". Machine direction and longitudinal direction are abbreviated as "MD" and "LD", respectfully. However, as used herein, the phrase "machine direction" includes not only the direction along a film that corresponds with the direction the film travels as it passes over idler rollers in the film production process, it also includes directions that deviate up to 44 degrees from the direction the film travels as it passes over idler rollers in the production process.

As used herein, the phrase "transverse direction" refers to a direction perpendicular to the machine direction. Transverse direction is abbreviated as "TD". The transverse direction also includes directions that deviate up to 44 degrees from the direction the film traveled as it passed over idler rollers in the production process.

As used herein, the phrases "inner layer" and "internal layer" refer to any layer, of a multilayer film, having both of its principal surfaces directly adhered to another layer of the film.

As used herein, the phrase "outer layer" refers to any layer of film having less than two of its principal surfaces directly adhered to another layer of the film. The phrase is inclusive of monolayer and multilayer films. In multilayer films, there are two outer layers, each of which has a principal surface adhered to only one other layer of the multilayer film. In a monolayer film, there is only one layer, which, of course, is an outer layer in that neither of its two principal surfaces is adhered to another layer of the film.

As used herein, the phrase "inside layer," also referred to as the "inside heat seal/product contact layer," refers to the outer layer, of a multilayer film packaging a product, which is closest to the product, relative to the other layers of the multilayer film. The package may be formed by sealing the multilayer film to itself or another component of the package. "Inside layer" also is used with reference to the innermost layer of a plurality of concentrically arranged layers simultaneously coextruded through an annular die.

As used herein, the phrase "outside layer" refers to the outer layer, of a multilayer film packaging a product, which is furthest from the product relative to the other layers of the multilayer film. The phrase "outside layer" also is used with reference to the outermost layer of a plurality of concentrically arranged layers coextruded through an annular die.

As used herein, the term "adhered" is inclusive of films which are directly adhered to one another using a heat-seal, heat lamination, or other means, as well as film layers adhered to one another using an adhesive between the two films. As used herein, the phrase "directly adhered", as applied to film layers, is defined as adhesion of the subject layer to the object layer, without a tie layer, adhesive, or other layer therebetween. In contrast, as used herein, the word "between", as applied to a film layer being between two other specified film layers, includes both direct adherence of the subject layer to the two other specified layers it is between, as well as including layers "indirectly adhered" to one another, i.e., with one or more additional layers between the subject layer and one or both of the other specified layers.

As used herein, the phrases "seal layer", "sealing layer", "heat seal layer", and "sealant layer", refer to an outer layer, or layers, involved in the sealing of the film to itself, another layer of the same or another film, and/or another article which is not a film.

As used herein, the term "heat-seal," and the phrase "heat-sealing," refer to any seal of a first region of a film surface to a second region of a film surface, wherein the seal is formed by heating the regions to at least their respective seal initiation temperatures. Heat-sealing is the process of joining two or more thermoplastic films or sheets by heating areas in contact with each other to the temperature at which fusion occurs, usually aided by pressure. The heating can be performed by any one or more of a wide variety of manners, such as using a heated bar, hot wire, hot air, infrared radiation, ultraviolet radiation, electron beam, ultrasonic, and melt-bead. A heat seal is usually a relatively narrow seal (e.g., 0.02 inch to 1 inch wide) across a film. One particular heat sealing means is a heat seal made using an impulse sealer, which uses a combination of heat and pressure to form the seal, with the heating means providing a brief pulse of heat while pressure is being applied to the film by a seal bar or seal wire, followed by rapid cooling of the bar or wire.

Sealant layers employed in the packaging arts have included the genus of thermoplastic polymer, which includes thermoplastic polyolefin, polyamide, polyester, polyvinyl chloride, and ionomer resin. Preferred polymers for the sealant layer include homogeneous ethylene/alpha-olefin copolymer, heterogeneous ethylene/alpha-olefin copolymer, ethylene homopolymer, ethylene/vinyl acetate copolymer, and ionomer resin.

In some embodiments, the seal layer can comprise a polyolefin, particularly an ethylene/alpha-olefin copolymer and/or an ionomer resin. For example, the seal layer can contain a polyolefin having a density of from 0.88 g/cc to 0.917 g/cc, or from 0.90 g/cc to 0.917 g/cc. More particularly, the seal layer can comprise at least one member selected from the group consisting of very low density polyethylene and homogeneous ethylene/alpha-olefin copolymer. Very low density polyethylene is a species of heterogeneous ethylene/alpha-olefin copolymer. The heterogeneous ethylene/alpha-olefin (e.g., very low density polyethylene) can have a density of from 0.900 to 0.917 g/cm$^3$. The homogeneous ethylene/alpha-olefin copolymer in the seal layer can have a density of from 0.880 g/cm$^3$ to 0.910 g/cm$^3$, or from 0.880 g/cm$^3$ to 0.917 g/cm$^3$. Homogeneous ethylene/alpha-olefin copolymers useful in the seal layer include metallocene-catalyzed ethylene/alpha-olefin copolymers having a density of from 0.917 g/cm$^3$ or less, as well as a very low density polyethylene having a density of 0.912 g/cm$^3$, these polymers providing excellent optics. Plastomer-type metallocene sealants with densities less than 0.910 g/cm$^3$ also provided excellent optics.

The multilayer heat-shrinkable film may optionally comprise a barrier layer. As used herein, the term "barrier," and the phrase "barrier layer," as applied to films and/or layers, is used with reference to the ability of a film or layer to serve as a barrier to one or more gases. The barrier layer may control at least 95% of the oxygen transmission rate, i.e., no other layer of the film affects the oxygen transmission rate more than 5% relative to the layer which serves as the oxygen barrier layer. Oxygen Transmission Rate is evaluated at 23° C. and 0% relative humidity, in accordance with ASTM D3985, which is hereby incorporated, in its entirety, by reference thereto. The phrase "oxygen transmission rate" ("OTR") is the amount of oxygen in cubic centimeters (cm$^3$) which will pass through a 100 square inches of film in 24 hours at 0% relative humidity and at 23° C. The thickness (gauge) of the film has a direct relationship on the oxygen transmission rate.

When referred to as an "oxygen barrier layer," the film containing such layer may allow gaseous oxygen to transmit therethrough at a rate of less than 500 cm$^3$/m$^2$/day (also referred to as 500 cm$^3$/m$^2$ day atm, or 500 cm$^3$/m$^2$ day atm 23° C., or 500 cm$^3$/m$^2$ day atm 23° C. @100% relative humidity), or less than 100 cm$^3$/m$^2$/day, or less than 50 cm$^3$/m$^2$/day, or less than 25 cm$^3$/m$^2$/day, or from 0 to 20 cm$^3$/m$^2$ day, or from 0 to 15 cm$^3$/m$^2$ day, or from 0 to 12 cm$^3$/m$^2$ day, or from 0 to 10 cm$^3$/m$^2$ day atm.

In the packaging art, oxygen (i.e., gaseous O$_2$) barrier layers can comprise, for example, at least one member selected from the group consisting of hydrolyzed ethylene/vinyl acetate copolymer (designated by the abbreviations "EVOH" and "HEVA", and also referred to as "saponified ethylene/vinyl acetate copolymer" and "ethylene/vinyl alcohol copolymer"), polyvinylidene chloride, amorphous polyamide, polyamide MXD6 (particularly MXD6/MXDI copolymer), polyester, polyacrylonitrile, polyalkylene carbonate, polyethylene naphthalate, etc, as known to those of skill in the art. In an embodiment, the thermoplastic oxygen barrier may be a blend of polyamides, such as a blend of about 85 wt % of a polyamide selected from the group consisting of nylon 4,6 (polytetramethylene adipamide), nylon 6 (polycaprolactam), nylon 6,6 (polyhexamethylene adipamide), nylon 6,9 (polyhexamethylene nonanediamide), nylon 6,10 (polyhexamethylene sebacamide), nylon 6,12 (polyhexamethylene dodecanediamide), nylon 6/12 copolymer (polycaprolactam/dodecanediamide), nylon 6,6/6 copolymer (polyhexamethylene adipamide/caprolactam), nylon 11 (polyundecanolactam), nylon 12 (polyauryllactam) or blends thereof, and about 15 wt % of an amorphous polyamide.

As used herein, the phrase "tie layer" refers to any internal layer having the primary purpose of adhering two layers to one another. Tie layers can comprise any polymer having a polar group grafted thereon. Such polymers adhere to both nonpolar polymers including polyolefin, as well as polar polymers including polyamide and ethylene/vinyl alcohol copolymer.

Tie layers may comprise at least one member selected from the group consisting of polyolefin, anhydride-modified polyolefin, ethylene/unsaturated ester copolymer, anhydride-modified ethylene/unsaturated ester copolymer, ethylene/unsaturated acid copolymer, and polyurethane. More specifically, tie layers may comprise at least one member selected from the group consisting of homogeneous ethylene/alpha-olefin copolymer, ethylene/vinyl acetate copolymer, anhydride-modified ethylene/vinyl acetate copolymer, ethylene/acrylic acid copolymer, and ethylene/methyl acrylate copolymer, anhydride-modified linear low density polyethylene, anhydride-modified low density polyethylene, anhydride-modified polypropylene, anhydride-modified ethylene/methyl acrylate copolymer, and anhydride-modified ethylene/butyl acrylate copolymer.

As used herein, the phrase "modified polymer", as well as more specific phrases such as "modified ethylene/vinyl acetate copolymer", and "modified polyolefin" refer to such polymers having an anhydride functionality, as defined immediately above, grafted thereon and/or copolymerized therewith and/or blended therewith. As used herein, the term "modified" refers to a chemical derivative, e.g. one having any form of anhydride functionality, such as anhydride of maleic acid, crotonic acid, citraconic acid, itaconic acid, fumaric acid, etc., regardless of whether grafted onto a polymer, copolymerized with a polymer, or blended with one or more polymers, and is also inclusive of derivatives of such functionalities, such as acids, esters, and metal salts derived therefrom. As used herein, the phrase "anhydride-containing polymer" and "anhydride-modified polymer," refer to one or more of the following: (1) polymers obtained by copolymerizing an anhydride-containing monomer with a second, different monomer, and (2) anhydride grafted copolymers, and (3) a mixture of a polymer and an anhydride-containing compound.

As used herein, the term "adhesive" refers to a polymeric material serving a primary purpose or function of adhering two surfaces to one another. The adhesive can be used to laminate two films together to make a laminate of the two films, or to laminate a film surface to a surface of a non-film component of a package (e.g., foam tray), or in place of a heat seal to bond a portion of a film surface to (i) itself (e.g., to make an end-seal bag, side-seal bag, etc) or (ii) a portion of a surface of another film (e.g., to make a pouch from two separate pieces of film), or (iii) a portion of a surface of a non-film component of a package (e.g., as a lidstock adhered to the flange portion of a tray, etc). The adhesive may be a polyurethane based adhesive, acrylic-based adhesive, or other known adhesive, including any one or more of the various polymers disclosed herein for use as a tie layer.

As used herein, the term "core", and the phrase "core layer", as applied to multilayer films, refer to any internal layer having a function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

In an embodiment, the core layer comprises the blend of the ethylene-based polymer, the ethylene-unsaturated ester copolymer, and the plastomer. The core layer may be in the first film portion which comprises a crosslinked polymer network, or may be present in a second film portion which does not comprise a crosslinked polymer network. A first core layer may be present in the first film portion comprising the crosslinked polymer network with a second core layer being in the second film portion which does not comprise crosslinked polymer network. In an extrusion coating process, as utilized in the examples below and as described herein an illustrated in FIG. 15, the core layer may be in the substrate which is irradiated to produce the crosslinked polymer network, or may be present in the coating which is not irradiated and does not contain a crosslinked polymer network, or there may be two core layers with one in the substrate and another in the coating.

As used herein, the phrase "packaging article" is inclusive end-seal bags, side-seal bags, L-seal bags, U-seal bags (also referred to as "pouches"), gusseted bags, backseamed tubings, and seamless casings. Packaging articles containing a film have the film sealed to itself or another element of the packaging article. The packaging article can be closed (e.g., by sealing) after the product is inserted therein. With bags, pouches, and casings, upon sealing the article closed the product is surrounded by the film from which the packaging article is made, with the combination of the product surrounded by the closed packaging article being herein termed as a "packaged product."

As used herein, packaging articles have two "sides". Generally, a "side" of a packaging article corresponds with half of the article. For example, an end-seal bag is a lay-flat bag and has two sides (in this case two lay-flat sides), with each side corresponding with a lay-flat side of the seamless tubing from which the end-seal bag is made. Each lay-flat side of a seamless tubing is bounded by the creases formed as the tubing is collapsed into its lay-flat configuration between nip rollers. Each side of an end-seal bag is bounded by the bag top edge, the bag bottom edge, and the two tubing creases running the length of the bag. Likewise, a side-seal bag also has two sides, with each side also being a lay-flat side, with each side of the side-seal bag being bounded by bag side edges, a bag top edge, and a bag bottom corresponding with a tubing crease. A casing, whether seamless or backseamed, also has two sides, with each side being bounded by the ends of the casing and by creases formed as the casing is configured into its lay-flat configuration. While gusseted bags and other packaging articles may not be fully lay-flat in their structure because they have more than two flat sides, they nevertheless have "sides" bounded by creases and edges.

As used herein, the term "package" refers to packaging materials configured around a product being packaged. As such, the term "package" includes all of the packaging around the product, but not the product itself.

As used herein, the phrase "packaged product" refers to the combination of a product and the package that surrounds or substantially surrounds the product. The packaged product can be made by placing the product into a packaging article made from the heat-shrinkable multilayer film, with the article then being sealed closed so that the multilayer film surrounds or substantially surrounds the product. The film can then be shrunk around the product.

As used herein, the term "bag" refers to a packaging article having an open top, side edges, and a bottom edge. The term "bag" encompasses lay-flat bags, pouches, casings (seamless casings and backseamed casings, including lap-sealed casings, fin-sealed casings, and butt-sealed backseamed casings having backseaming tape thereon). Various casing configurations are disclosed in U.S. Pat. No. 6,764,729 B2, to Ramesh et al, entitled "Backseamed Casing and Packaged Product Incorporating Same, which is hereby incorporated in its entirety, by reference thereto. Various bag configurations, including L-seal bags, backseamed bags, and U-seal bags (also referred to as pouches), are disclosed in U.S. Pat. No. 6,970,468, to Mize et al, entitled "Patch Bag and Process of Making Same", which is hereby incorporated, in its entirety, by reference thereto. While the bag configurations illustrated in the '468 patent have a patch thereon, for purposes of the present invention, the patch is optional.

As used herein, the phrase "lay-flat bag" refers generically to non-gusseted bags used for the packaging of a variety of products, particularly food products. More specifically, the phrase "lay-flat bag" includes side seal bag, end-seal bag, L-seal bag, U-seal bag (also referred to as a pouch), and backseamed bag (also referred to as T-seal bag). The backseam can be a fin seal, a lap seal, or a butt-seal with a backseaming tape. Before the bag is shrunk, it can have a length-to-width ratio of from 1:1 to 20:1; or from 1.5:1 to 8:1; or from 1.8:1 to 6:1; or from 2:1 to 4:1.

End-seal bags, side-seal bags, L-seal bags, T-seal bags (also referred to as backseamed bags), and U-seal bags all have an open top, closed sides, a closed bottom, and at least one heat seal. Each of these heat seals is referred to as a "factory seal" because these seals are made in a bag-making factory, rather than in a packaging factory where the bag is used to package a product. Each of the heat seals illustrated in FIGS. 1 and 2-14 is a factory seal. Each of the factory seals is generally made a short distance inward of the edge of the article, so that a relatively small amount of film remains outward of the heat seal, i.e., on the other side of the seal from the film that envelopes the product. A gusseted bag can also be made with a bottom seal that has a skirt, and a casing (backseamed or seamless), and can have a transverse heat seal with a skirt. As used herein, the term "skirt" refers to the film that is outward of any one or more of the factory seals.

The term "polymer" refers to the product of a polymerization reaction, and is inclusive of homopolymer, copolymer, terpolymer, etc. The term "copolymer" includes copolymer, terpolymer, etc.

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "homopolymer" is used with reference to a polymer resulting from the polymerization of a single monomer, i.e., a polymer consisting essentially of a single type of "mer," i.e., repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. However, the term "copolymer" is also inclusive of, for example, the copolymerization of a mixture of ethylene, propylene, 1-hexene, and 1-octene. The term copolymer is also inclusive of polymers produced by reaction, such as graft copolymer, block copolymer, and random copolymer.

As used herein, the term "polymerization" is inclusive of homopolymerizations, copolymerizations, terpolymerizations, etc., and includes all types of copolymerizations such as random, graft, block, etc. Polymers in the films used in accordance with the present invention, can be prepared in accordance with any suitable polymerization process, including slurry polymerization, gas phase polymerization, and high pressure polymerization processes.

As used herein, the term "copolymerization" refers to the simultaneous polymerization of two or more monomers to result in a copolymer. As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

Copolymers can be identified, i.e., named, in terms of the monomers from which the copolymers are produced. For example, the phrase "propylene/ethylene copolymer" refers to a copolymer produced by the copolymerization of both propylene and ethylene, with or without additional comonomer(s). A copolymer comprises recurring "mer" units derived from the monomers from which the copolymer is produced, e.g., a propylene/ethylene copolymer comprises propylene mer units and ethylene mer units.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, terms such as "polyamide", "polyolefin", "polyester", etc are inclusive of homopolymers of the genus, copolymers of the genus, terpolymers of the genus, etc, as well as graft polymers of the genus and substituted polymers of the genus, e.g., polymers of the genus having substituent groups thereon.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and a non-olefinic comonomer copolymerizable with the olefin, such as vinyl monomers, modified polymers thereof, and the like. Specific examples include ethylene homopolymer, propylene homopolymer, polybutene (also referred to as polybutylene), ethylene/α-olefin copolymer, ethylene/propylene copolymer, propylene/ethylene copolymer, propylene/α-olefin copolymer, butene/α-olefin copolymer, low density polyethylene, linear low density polyethylene, very low density polyethylene, ultra low density polyethylene, medium density polyethylene, high density polyethylene, ethylene/butene copolymer, ethylene/hexene copolymer, ethylene/octene copolymer, polyisoprene, polymethyl butene (including poly-3-methylbutene-1), polymethylpentene (including poly-4-methylpentene-1), ethylene/unsaturated ester copolymer, ethylene/unsaturated acid copolymer (including ethylene/acrylate copolymer, such as ethylene/butyl acrylate copolymer, ethylene/methyl acrylate copolymer, ethylene/acrylic acid copolymer, and ethylene/methacrylic acid copolymer), and ionomer resin, "Modified polyolefin" is inclusive of modified polymer prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. Modified polyolefin could also be obtained by incorporating an unsaturated carboxylic acid, e.g., maleic acid, fumaric acid or the like, or a derivative thereof such as the anhydride, ester or metal salt or the like, into the olefin homopolymer or copolymer.

As used herein, the phrase "propylene/ethylene copolymer" refers to a copolymer of propylene and ethylene wherein the propylene mer content is greater than the ethylene mer content. Propylene/ethylene copolymer is not a species of "ethylene/alpha-olefin copolymer".

As used herein, the phrase "ethylene-based polymer" refers to ethylene homopolymer, modified ethylene homopolymer, ethylene/alpha-olefin copolymer, modified ethylene/alpha-olefin copolymer, propylene/ethylene copolymer, modified propylene/ethylene copolymer, ionomer resin, and blends thereof. The ethylene/alpha-olefin copolymer may be homogeneous or heterogeneous. "Ethylene-based polymer" does not include polyvinylidene chloride or other oxygen barrier polymer, does not include polyamide, does not include polyester, does not include ethylene/unsaturated ester copolymer, and does not include ethylene/unsaturated acid copolymer.

The phrase "ethylene/alpha-olefin copolymer" refers to heterogeneous copolymers such as linear low density polyethylene (LLDPE, having a density of 0.919 to 0.925 g/cm$^3$), very low density polyethylene (VLDPE, having a density of 0.900 to 0.915 g/cm$^3$), and ultra low density polyethylene (ULDPE, having a density of from 0.86 to 0.899 g/cm$^3$), as well as homogeneous polymers such as metallocene catalyzed polymers such as EXACT® resins obtainable from the Exxon Chemical Company, AFFINITY® and ENGAGE® resins available from The Dow Chemical Company, and TAFMER® resins obtainable from the Mitsui Petrochemical Corporation. These copolymers include copolymers of ethylene with one or more comonomers selected from $C_4$ to $C_{10}$ alpha-olefin such as butene-1 (i.e., 1-butene), hexene-1, octene-1, etc. in which the molecules of the copolymers comprise long chains with relatively few side chain branches or cross-linked structures. Ethylene/α-olefin copolymer may result from the copolymerization of 80 to 99 wt % ethylene with 1 to 20 wt % α-olefin, or the copolymerization of 85 to 95 wt % ethylene with 5 to 15 wt % α-olefin.

As used herein, the phrase "heterogeneous polymer" refers to polymerization reaction products of relatively wide variation in molecular weight and relatively wide variation in composition distribution, i.e., typical polymers prepared, for example, using conventional Ziegler-Natta catalysts. Heterogeneous polymers typically contain a relatively wide variety of chain lengths and comonomer percentages. Heterogeneous copolymers have a molecular weight distribution (Mw/Mn) greater than 3.0.

As used herein, the phrase "homogeneous polymer" refers to polymerization reaction products of relatively narrow molecular weight distribution and relatively narrow composition distribution. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts. Homogeneous ethylene/alpha-olefin copolymer has a Mw/Mn of ≤3.0.

Homogeneous ethylene/α-olefin copolymers may be characterized by one or more methods known to those of skill in the art, such as molecular weight distribution ($M_w/M_n$), composition distribution breadth index (CDBI), and narrow melting point range and single melt point behavior. The molecular weight distribution ($M_w/M_n$), also known as polydispersity, may be determined by gel permeation chromatography. The homogeneous ethylene/alpha-olefin copolymers may have an $M_w/M_n$≤3, or ≤2.7, or from 1.9 to 2.5, or from 1.9 to 2.3. The Composition Distribution Breadth Index (CDBI) of such homogeneous ethylene/alpha-olefin copolymers will generally be greater than about 70 percent. CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. CDBI is determined via the technique of Temperature Rising Elution Fractionation (TREF). CDBI determination distinguishes the homogeneous copolymers used in the present invention (narrow composition distribution as assessed by CDBI values generally above 70%) from VLDPE available commercially which generally have a broad composition distribution as assessed by CDBI values generally less than 55%. The CDBI can be calculated from data obtained from TREF, for example as disclosed by Wild et. al., *J. Poly. Sci. Poly. Phys. Ed.*, Vol. 20, p. 441 (1982). Preferably, the homogeneous ethylene/alpha-olefin copolymer has a CDBI of from about 70% to about 99%. Homogeneous ethylene/alpha-olefin copolymers exhibit a relatively narrow melting point range, in comparison with heterogeneous copolymers, e.g., homogeneous ethylene/alpha-olefin copolymers may exhibit an essentially singular melting point of from about 60° C. to about 105° C., or from 80° C. to about 100° C. As used herein, the phrase "essentially single melting point" means that at least about 80 wt % of the material corresponds to a single Tm peak at a temperature within the range of from about 60° C. to about 105° C., and essentially no substantial fraction of the material has a peak melting point in excess of about 115° C.

Homogeneous ethylene/alpha-olefin copolymer can be prepared by the copolymerization of ethylene and any one or more alpha-olefin. Preferably, the alpha-olefin is a $C_{3-20}$ α-monoolefin, more preferably, a $C_{4-12}$ α-monoolefin, still more preferably, a $C_{4-8}$ α-monoolefin. The alpha-olefin may comprise at least one member selected from the group consisting of butene-1, hexene-1, and octene-1, i.e., 1-butene, 1-hexene, and 1-octene; or just octene-1; or a blend of hexene-1 and butene-1.

Processes for preparing and using homogeneous polymers are disclosed in U.S. Pat. Nos. 5,206,075, 5,241,031, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another genus of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the phrase "plastomer" refers to a polymer which combines the qualities of elastomers and plastics, such as rubber-like properties with the processing ability of plastics. Suitable plastomers for use in the multilayer film include homogeneous ethylene/alpha-olefin copolymers.

Plastomers for use in the multilayer film may have a peak melting point ≤90° C., or ≤88° C., or ≤85° C., or ≤82° C., or ≤80° C.; or a peak melting point of from 45° C. to 90° C., or from 50° C. to 85° C., or from 55° C. to 85° C., or from 55° C. to 80° C. The plastomer may be an ethylene/alpha-olefin copolymer, particularly a homogeneous ethylene/alpha-olefin copolymer.

The plastomer may have a melt index ≤1.1 gram/10 min, or ≤1.0 gram/10 min, or ≤0.95 gram/10 min, or ≤0.90 gram/10 min, or from 0.7 to 1.1 gram/10 min, or from 0.75 to 1.0 gram/10 min, or from 0.8 to 0.95 gram/10 min, or from 0.85 to 0.90 gram/10 min, or from 0.86 to 0.89 gram/10 min.

In an embodiment the outside film layer, and/or in the barrier layer, and/or one or more tie layers, may comprise polyester. As used herein, the term "polyester" refers to a homopolymer and/or copolymer having an ester linkage between monomer units. The ester linkage may be formed, for example, by a condensation polymerization reaction between a dicarboxylic acid and a glycol. The dicarboxylic acid may be aliphatic, i.e., oxalic acid, malonic acid, succinic acid, glutaric acid, adipic acid, pimelic acid, suberic acid, azelaic acid, sebacic acid, and the like; or may be substituted or unsubstituted aromatic, e.g., various isomers of phthalic acid (i.e., ortho-phthalic acid), such as isophthalic acid (i.e., meta-phthalic acid), and terephthalic acid (i.e., para-phthalic acid), as well as naphthalic acid. Specific examples of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthophthalic acid, the various isomers of dimethylnaphthalic acid, such as 2,6-dimethylnaphthalic acid and 2,5-dimethylnaphthalic acid, and the various isomers of diethylnaphthalic acid. The dicarboxylic acid can alternatively be 2,5-furandicarboxylic acid (FDCA). The glycols may be straight-chained or branched. Specific examples include ethylene glycol, propylene glycol, trimethylene glycol, 1,4-butane diol, neopentyl glycol and the like. The glycols include modified glycols such as cyclohexane dimethanol. The polyester in the outer layer of the film can comprise any of the above polyesters.

The polyester may comprise at least one member selected from the group consisting of polyethylene terephthalate homopolymer, polyethylene terephthalate copolymer (including polyethylene terephthalate glycol, PETG), polycyclohexane dimethylene terephthalate (PCT, and copolymers thereof, such as PCTG), polycyclohexanedimethanol terephthalic acid (PCTA, and copolymers thereof, such as PCTAG), polybutylene terephthalate homopolymer (PBT, and copolymers thereof, such as PBTG), polynaphthalene terephthalate homopolymer, polynaphthalene terephthalate copolymer, polyethylene furanoate homopolymer, and polyethylene furanoate copolymer.

AVANTIUM® bio-based polyester is a polyethylene furanoate which per unit thickness exhibits only one tenth the oxygen transmission rate of polyethylene terephthalate (PET), one fourth the carbon dioxide transmission rate of PET, and one half the water vapor transmission rate of PET. Polyethylene furanoate is more heat-resistant than PET, with a glass transition temperature ($T_g$) 12° C. higher than PET, with a melt point of 165° C., which is higher than PET. Furthermore, polyethylene furanoate is recyclable alone or in a blend with PET. Polyethylene furanoate can be extruded to form films. Polyethylene furanoate is made by polymerizing ethylene glycol and 2,5-furandicarboxylic acid (FDCA). Polyethylene furanoate is renewable, as it is bio-based.

As used herein, the term "polyamide" refers to homopolymers, copolymers, or terpolymers having an amide linkage between monomer units which may be formed by any method known to those of skill in the art. The polyamides approved for use in producing articles intended for use in processing, handling, and packaging food, including homopolymers, copolymers and mixtures of polyamides, are described in 21 C.F.R. 177.1500 et seq., which is hereby incorporated in its entirety, by reference thereto. Useful polyamide homopolymers include nylon 6 (polycaprolactam), nylon 11 (polyundecanolactam), nylon 12 (polylauryllactam), and the like. Other useful polyamide homopolymers also include nylon 4,2 (polytetramethylene ethylenediamide), nylon 4,6 (polytetramethylene adipamide), nylon 6,6 (polyhexamethylene adipamide), nylon 6,9 (polyhexamethylene azelamide), nylon 6,10 (polyhexamethylene sebacamide), nylon 6,12 (polyhexamethylene dodecanediamide), nylon 6/12 (poly(caprolactam-co-laurallactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 7,7 (polyheptamethylene pimelamide), nylon 8,8 (polyoctamethylene suberamide), nylon 9,9 (polynonamethylene azelamide), nylon 10,9 (polydecamethylene azelamide), nylon 12,12 (polydodecamethylene dodecanediamide), and the like. Polyamide copolymers include nylon 6,6/6 copolymer (polyhexamethylene adipamide/caprolactam copolymer), polyamide 6/6,6 copolymer (polycaprolactam/hexamethylene adipamide copolymer), polyamide 6,2/6,2 copolymer (polyhexamethylene ethylenediamide/hexamethylene ethylenediamide copolymer), nylon 6,6/6, 9/6 copolymer (polyhexamethylene adipamide/hexamethylene azelaiamide/caprolactam copolymer), as well as other polyamides. Additional polyamides include polyamide 4,1, polyamide 6,1, polyamide 6,6/6I copolymer, polyamide 6,6/6T copolymer, polyamide MXD6 (poly-m-xylylene adipamide), polyamide 6I/6T copolymer, polyamide 6/MXDT/I copolymer, polyamide MXDI, poly-p-xylylene adipamide, polyhexamethylene terephthalamide, polydodecamethylene terephthalamide, and the like.

As used herein, the phrase "amorphous polyamide" refers to a polyamide with an absence of a regular three-dimensional arrangement of molecules or subunits of molecules extending over distances which are large relative to atomic dimensions. However, regularity of structure exists on a local scale. See "Amorphous Polymers," in *Encyclopedia of Polymer Science and Engineering*, 2nd Ed., pp. 789-842 (J. Wiley & Sons, Inc. 1985), having Library of Congress Catalogue Card Number 84-19713. Amorphous polyamide is recognized by one skilled in the art of DSC (using ASTM 3417-83) as having no measurable melting point (i.e., less than 0.5 cal/g) or no heat of fusion. Amorphous polyamide is prepared from a condensation polymerization reaction of a diamine with a dicarboxylic acid. For example, an aliphatic diamine is combined with an aromatic dicarboxylic acid, or an aromatic diamine is combined with an aliphatic dicarboxylic acid, to result in amorphous polyamide.

Unless otherwise indicated, the phrase "semi-crystalline polyamide" includes all polyamides that are not considered to be amorphous polyamides. All semi-crystalline polyamides have a determinable melting point. The semi-crystalline polyamide may have a melting point of fro 125° C. to270° C., or from 250° C. to 270° C.

As used herein, the phrase "cyclic polymer" includes cyclic olefin copolymer, whether aliphatic or phenolic, i.e., including ethylene/norbornene copolymer, polycyclododecene, polyester, and cyclic olefin polymer.

Each polymer melt index value disclosed herein was determined in accordance with ASTM D1238, with the test being carried out (unless specified otherwise) at 190° C. and 2.16 kg. ASTM D1238 is hereby incorporated, in its entirety, by reference thereto.

Each polymer density value disclosed herein was determined in accordance with ASTM D792, which is hereby incorporated, in its entirety, by reference thereto.

As used herein, the phrase "peak melting point" refers to the peak at the highest temperature in a Differential Scanning calorimeter curve (DSC curve) plotting Energy Input on the Y axis and Temperature on the X axis. Peak melt point corresponds with the highest temperature at which energy input is needed to phase change the highest melting portion of the polymer from solid to liquid.

In an embodiment, the plastomer may have a density of less than 0.905 g/cm$^3$, or less than 0.902 g/cm$^3$, or less than 0.900, or less than 0.895 g/cm$^3$, or less than 0.890 g/cm$^3$, or less than 0.886 g/cm$^3$; or have a density of from 0.857 g/cm$^3$ to 0.908 g/cm$^3$, or from 0.86 g/cm$^3$ to 0.905 g/cm$^3$, or from 0.87 g/cm$^3$ to 0.903 g/cm$^3$, or from 0.875 g/cm$^3$ to 0.902 g/cm$^3$, or from 0.88 g/cm$^3$ to 0.900 g/cm$^3$, or from 0.88 g/cm$^3$ to 0.895 g/cm$^3$, or from 0.88 g/cm$^3$ to 0.89 g/cm.

In an embodiment, the plastomer is present in the film in an amount of at least 3.5 wt %, or at least 4 wt %, or at least 4.5 wt %, or at least 5 wt %, or at least 5.5 wt %, or at least 6 wt %, based on total film weight. In an embodiment, the plastomer is present in the film in an amount of from 3 to 20 wt %, or from 3.5 to 15 wt %, or from 4 to 12 wt %, or from 4.5 to 10 wt %, or from 5 to 8 wt %, or from 5.5 to 7 wt &, or from 5.5 to 6.5 wt %, based on total film weight.

As used herein, the phrase "acrylate-based polymer" refers to homopolymer, copolymer, including e.g. bipolymer, terpolymer, etc., having an acrylate moiety in at least one of the repeating units forming the backbone of the polymer. In general, acrylate-based polymers are also known as polyalkyl acrylates. Acrylate-based polymers may be prepared by any method known to those of skill in the art. Acrylate-based polymers include ethylene/vinyl acrylate copolymer, ethylene/methacrylate copolymer, ethylene/butyl acrylate copolymer, and the like.

As used herein, the phrase "styrene-based polymer" refers to at least one polymer selected from the group consisting of styrene-ethylene-butylene-styrene copolymer, styrene-butadiene-styrene copolymer, styrene-isoprene-styrene copolymer, styrene-ethylene-butadiene-styrene copolymer, and styrene-(ethylene-propylene rubber)-styrene copolymer. As used herein the use of a "dash" (i.e., the "-") in a styrene-based polymer formula, is inclusive of both block copolymers and random copolymers. More particularly, the phrase "styrene-based polymer" includes both copolymers in which (i) all named monomers are present as a block, or (ii) any subset of the named monomers are present as a block with the remaining monomers being randomly arranged, or (iii) all named monomers are randomly arranged.

Unless indicated otherwise, as used herein, the phrase "the ethylene-based polymer having a peak melting point ≥95° C. . . . making up from X to Y wt %, based on total film weight" refers to the sum of all the ethylene-based polymers having a peak melting point ≥95° C., anywhere in the film.

Unless indicated otherwise, as used herein, the phrase "the ethylene/unsaturated ester copolymer . . . making up from M to N wt %, based on total film weight" refers to the sum of all the ethylene/unsaturated ester copolymers in the film, regardless of whether unmodified, modified, etc.

Unless indicated otherwise, as used herein, the phrase "the ethylene-based polymer having a peak melting point ≥95° C. . . . making up from A to B wt %, based on weight of the first film portion" refers to the sum of all the ethylene-based polymers having a peak melting point ≥95° C., anywhere in the first film portion.

Unless indicated otherwise, as used herein, the phrase "the ethylene/unsaturated ester copolymer . . . making up from C to D wt %, based on total film weight" refers to the sum of all the ethylene/unsaturated ester copolymers in the first film portion, regardless of whether unmodified, modified, etc.

As used herein, the term "oriented" refers to a polymer-containing material which has been drawn and/or stretched at an elevated temperature (elevated to its softening point, but not to its melt point, so that the material remains in the solid state during orientation), followed by being "set" in the stretched configuration by cooling the material while substantially retaining the stretched dimensions. Upon subsequently heating the unrestrained, unannealed, oriented polymer-containing material to its orientation temperature, heat shrinkage is produced almost to the original unstretched, i.e., pre-oriented dimensions. More particularly, the term "oriented", as used herein, refers to oriented films, wherein the orientation can be produced in one or more of a variety of manners.

As used herein, the phrase "orientation ratio" refers to the multiplication product of the extent to which the plastic film material is expanded in several directions, usually two directions perpendicular to one another. Expansion in the machine direction is herein referred to as "drawing", whereas expansion in the transverse direction is herein referred to as "stretching". For films extruded through an annular die, stretching is usually obtained by "blowing" the film to produce a bubble. For such films, drawing is usually obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, or sometimes as the "racking ratio".

The film is a heat-shrinkable film. The film can be produced by carrying out only monoaxial orientation or biaxial orientation. As used herein, the phrases "heat-shrinkable," "heat-shrink," and the like, refer to the tendency of a film, generally an oriented film, to undergo free shrink upon the application of heat, i.e., to contract upon being heated, such that the size (i.e., surface area) of the film decreases while the film is in an unrestrained state. Likewise, the tension of a heat-shrinkable film increases upon the application of heat if the film is restrained from shrinking.

Heat shrinkability can be achieved by carrying out orientation in the solid state (i.e., at a temperature below the glass transition temperature of the polymer). In biaxial orientation, the total orientation factor employed (i.e., stretching in the transverse direction multiplied by drawing in the machine direction) can be any desired factor, such as 2× in the machine direction and 2× in the transverse direction (i.e., a "2×2 orientation," producing a total orientation factor 4×), or a 3×3 orientation (9× total orientation), or a 3.2×3.5 orientation (11.2× total orientation), etc. The total orientation can be at least 3×, at least 4×, at least 5×, at least 6×, at least 7×, at least 8×, at least 9×, at least 10×, at least 16×, or from 8× to 18×, from 10× to 16×, from 11× to 15×, or from 12× to 14×.

As used herein, the phrase "free shrink" refers to the percent dimensional change in a 10 cm. by 10 cm. specimen of film, when subjected to selected heat (i.e., at a certain temperature), with the quantitative determination being carried out according to ASTM D 2732, as set forth in the 1990 Annual Book of ASTM Standards, Vol. 08.02, pages 368-371, which is hereby incorporated, in its entirety, by reference thereto. The free shrink test is carried out by immersing the film specimen for 5 seconds in a water bath heated to 85° C. As used herein, the phrase "@STP" refers to the test being carried out under standardized test conditions, i.e., one atmosphere of pressure, 23° C., and 0% relative humidity. "Total free shrink" is determined by summing the percent free shrink in the machine direction with the percentage of free shrink in the transverse direction. For example, a film which exhibits 55% free shrink in the transverse direction at 85° C., and 45% free shrink in the machine direction at 85° C., has a "total free shrink" at 85° C. of 100%.

As used herein, the phrase "heat-shrinkable" is used with reference to all films which exhibit a total free shrink (i.e., L+T) of at least 10% at 85° C., according to ASTM D2732 by immersion of the film specimen for 5 seconds in a water bath heated to 85° C. All films exhibiting a total free shrink of less than 10% at 85° C. are herein designated as non-heat-shrinkable. The heat-shrinkable film multilayer film can have a total free shrink at 85° C. of at least 90%, or at least 95%, or at least 100%, or at least 105%, or at least 110%; or from 90% to 150%, or from 95% to 130%, or from 95% to 120%, as measured by ASTM D 2732.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process of extruding two or more materials through a single die with two or more orifices arranged so that the extrudates merge and weld together into a laminar structure before chilling, i.e., quenching. Coextrusion can be employed in film blowing, free film extrusion, and extrusion-coating processes.

The film comprises a crosslinked polymer network. In an embodiment, the film is irradiated to induce crosslinking, i.e., to form the crosslinked polymer network. The film can also be subjected to corona treatment to roughen any surfaces of the film which are to be adhered to one another. Irradiation induces polymer crosslinking, particularly of polyolefin in the film. The film can be subjected to irradiation using an energetic radiation treatment, such as corona discharge, plasma, flame, ultraviolet, X-ray, gamma ray, beta ray, and high energy electron treatment, which induce crosslinking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

To produce crosslinking, a suitable radiation dosage of high energy electrons is employed, preferably using an electron accelerator, with a dosage level being determined by standard dosimetry methods. Other accelerators such as a Van de Graaf or resonating transformer may be used. The radiation is not limited to electrons from an accelerator since any ionizing radiation may be used. The ionizing radiation can be used to crosslink the polymers in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR. The crosslinked polymer network may be formed by irradiating the first film portion at a level of from 16 to 166 kGy, or from 30 to 120 kGy, or from 30 to 90 kGy, or from 50 to 80 kGy, or from 55 to 75 kGy. Irradiation can be carried out by an electron accelerator with the dosage level determined by standard dosimetry processes. Other accelerators such as a van der Graaf or resonating transformer may be used. The radiation is not limited to electrons from an accelerator since any ionizing radiation may be used.

The heat-shrinkable, multilayer film can be prepared using an extrusion-coating process. This allows annular extrudate 214 (see FIG. 15), herein referred to as a first film portion and as the "substrate," to be crosslinked by irradiation before one or more additional layers (i.e., the "coating") are extrusion-coated over the substrate. Irradiation produces a stronger polymer network by crosslinking the polymer chains. Extrusion-coating allows the substrate portion of the resulting multilayer laminate to possess a crosslinked polymer network, while at the same time avoiding irradiation of, for example, a layer of polyvinylidene chloride applied to the substrate during the extrusion-coating. Irradiation of PVDC can result in the degradation of the PVDC. Extrusion-coating and irradiation are disclosed in U.S. Pat. No. 4,278,738, to Brax et al, which is hereby incorporated, in its entirety, by reference thereto.

Figure 2:
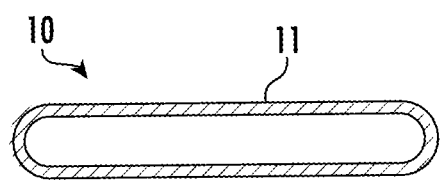
FIG. 2 is a transverse cross-sectional view of the end-seal bag of FIG. 1, taken through section 2-2 of FIG. 1.

FIG. 1 is a schematic of end-seal bag 10, in a lay-flat configuration. FIG. 2 is a cross-sectional view of bag 10 taken through section 2-2 of FIG. 1. Viewing FIGS. 1 and 2 together, bag 10 comprises bag film 11, top edge 12 defining an open top, first bag side edge 13, second bag side edge 14, bottom edge 15, and end seal 16.

Figure 3:
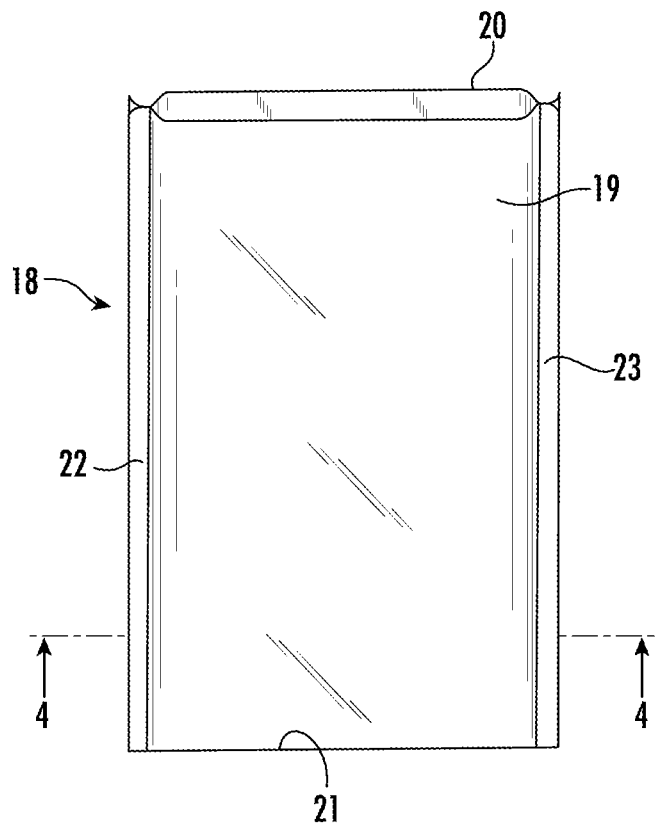
FIG. 3 is a schematic plan view of a side-seal bag.
Figure 4:
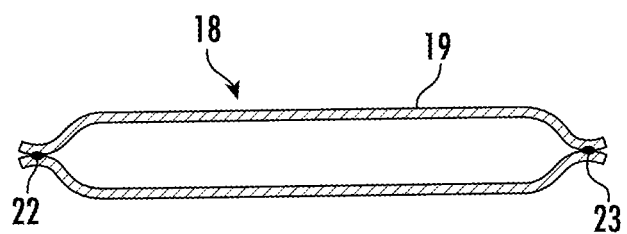
FIG. 4 is a transverse cross-sectional view of the side-seal bag of FIG. 3, taken through section 4-4 of FIG. 3.

FIGS. 3 and 4 illustrate side-seal bag 18, in lay-flat configuration. FIG. 3 illustrates a schematic of side seal bag 18, in a lay-flat configuration. FIG. 4 illustrates a cross-sectional view taken through section 4-4 of FIG. 3. With reference to FIGS. 3 and 4 together, side seal bag 18 is comprised of bag film 19, top edge 20 defining an open top, folded bottom edge 21, first side seal 22, and second side seal 23.

Figure 5:
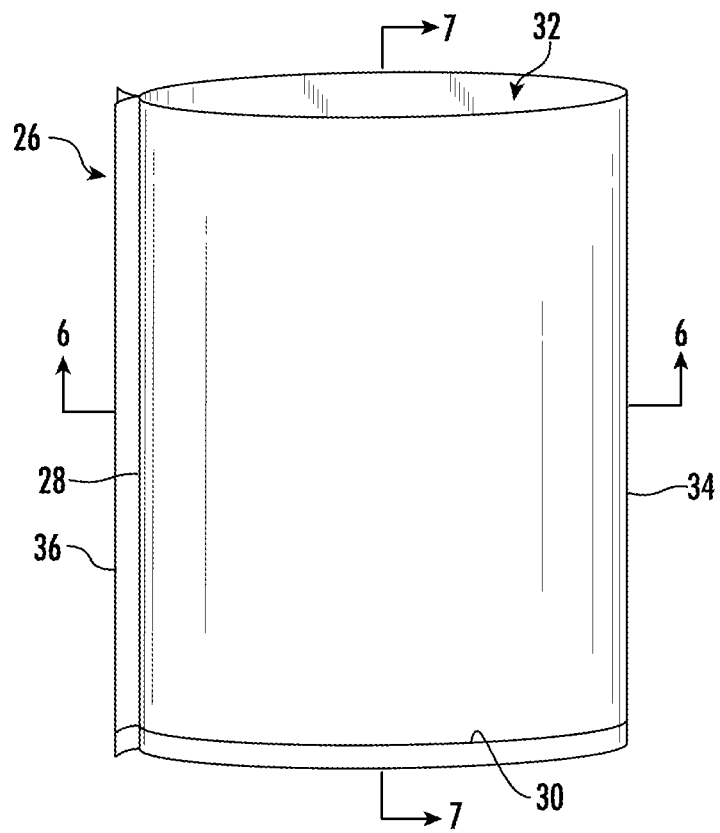
FIG. 5 is a schematic plan view of an L-seal bag.
Figure 6:
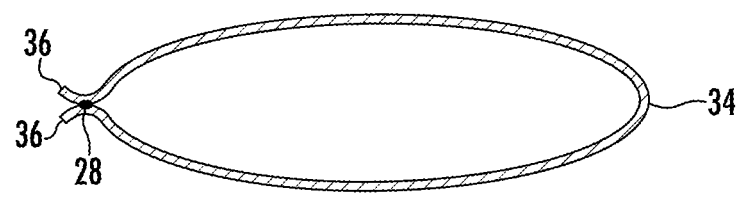
FIG. 6 is a transverse cross-sectional view of the L-seal bag of FIG. 5, taken through section 6-6 of FIG. 5.
Figure 7:
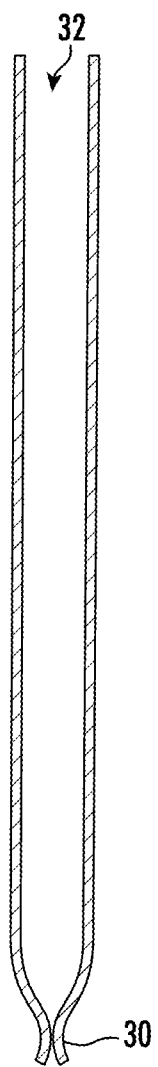
FIG. 7 is a longitudinal cross-sectional view of the L-seal bag of FIG. 5, taken through section 7-7 of FIG. 5.

FIG. 5 is a lay-flat view of L-seal bag 26, in a lay-flat position. FIG. 6 is a transverse cross-sectional view of L-seal bag 26, taken through section 6-6 of FIG. 5. FIG. 7 is a longitudinal cross-sectional view of L-seal bag 26 taken through section 7-7 of FIG. 5. Viewing FIGS. 5, 6, and 7 together, L-seal bag 26 has side-seal 28, bottom seal 30, open top 32, seamless folded bag side edge 34, and seamed bag side edges 36.

Figure 8:
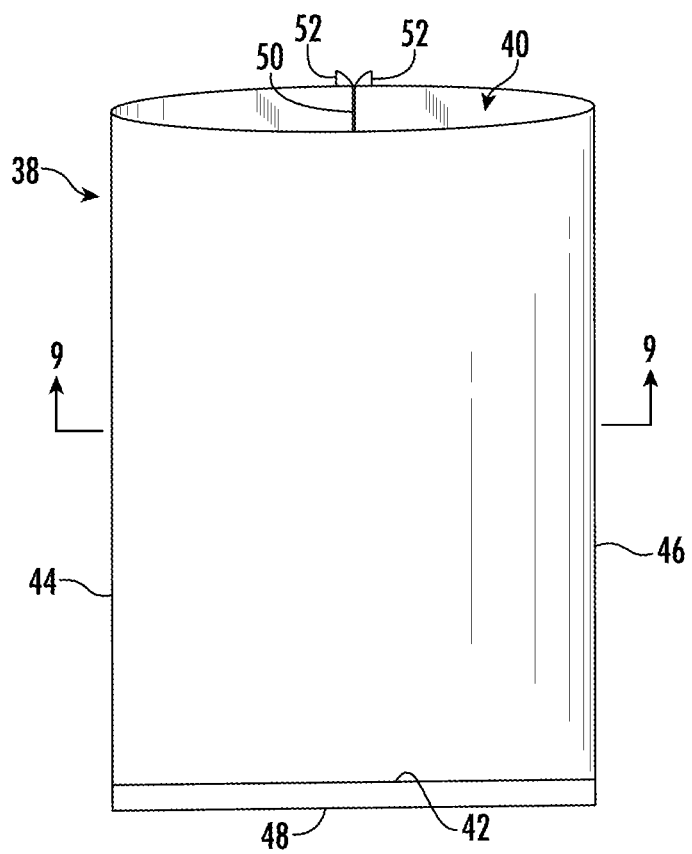
FIG. 8 is a schematic plan view of a backseamed bag having a fin-type backseam.
Figure 9:
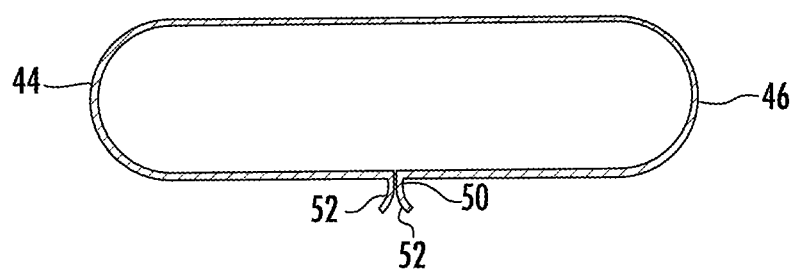
FIG. 9 is a transverse cross-sectional view of the backseamed bag of FIG. 8.

The fin-seal backseamed bag 38 of FIGS. 8 and 9 has open top 40, bottom seal 42, first folded side edge 44, second folded side edge 46, bottom edge 48, backseam seal 50 (inside film layer heat sealed to itself), and backseam fins 52.

Figure 10:
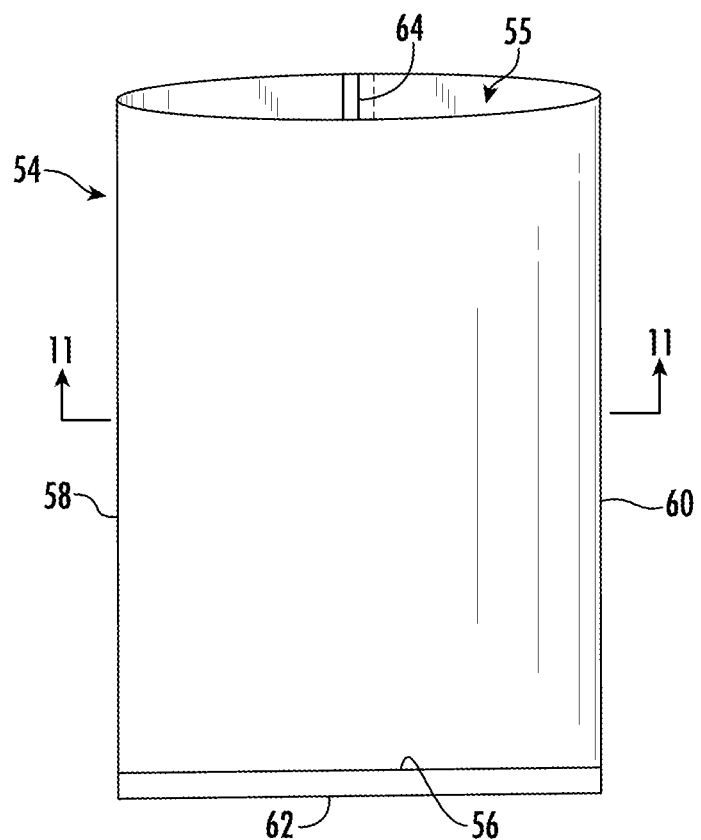
FIG. 10 is a schematic plan view of a backseamed bag having a lap-type backseam.
Figure 11:
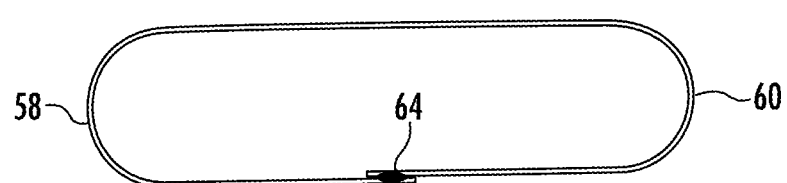
FIG. 11 is a transverse cross-sectional view of the backseamed bag of FIG. 10.

Lap-seal backseamed bag 54 of FIGS. 10 and 11 has open top 55, bottom seal 56, first folded side edge 58, second folded side edge 60, bottom edge 62, and backseam seal 64 (inside film layer heat sealed to outside film layer).

Figure 12:
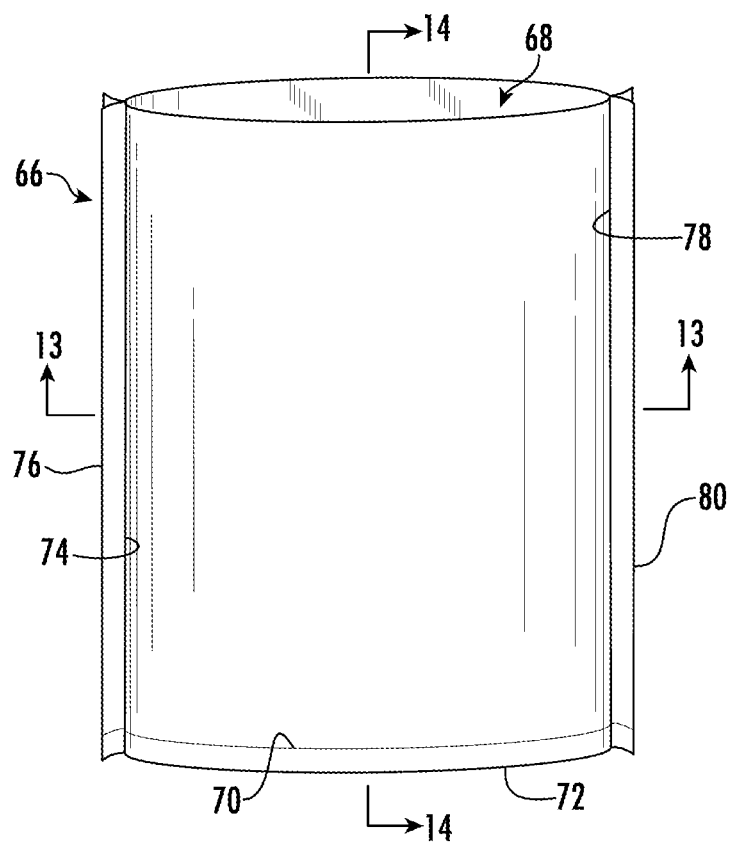
FIG. 12 is a schematic plan view of a pouch-type bag.
Figure 13:
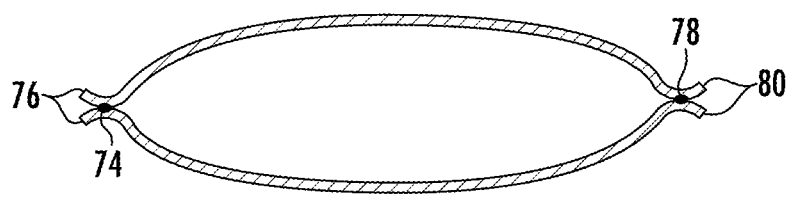
FIG. 13 is a transverse cross-sectional view of the pouch-type bag of FIG. 12, taken through section 13-13 of FIG. 12.
Figure 14:
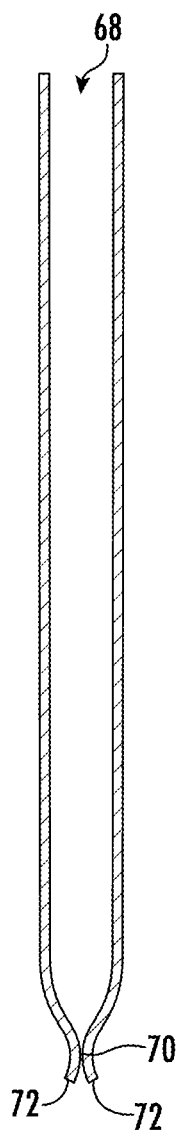
FIG. 14 is a longitudinal cross-sectional view of the pouch-type bag of FIG. 12, taken through section 14-14 of FIG. 12.

FIGS. 12, 13, and 14 illustrate a pouch-type bag 66 made from sealing two separate pieces of flat film together. In FIGS. 12, 13, and 14, pouch 66 has open top 68, bottom heat seal 70 and bottom edge 72, first side seal 74 and first side edge 76, second side seal 78 and second side edge 80. Together, first and second side seals 74 and 76 connect with bottom seal 70 to form a "U-shaped" seal connecting the two pieces of flat film together to form the pouch-type bag 66.

Figure 15:
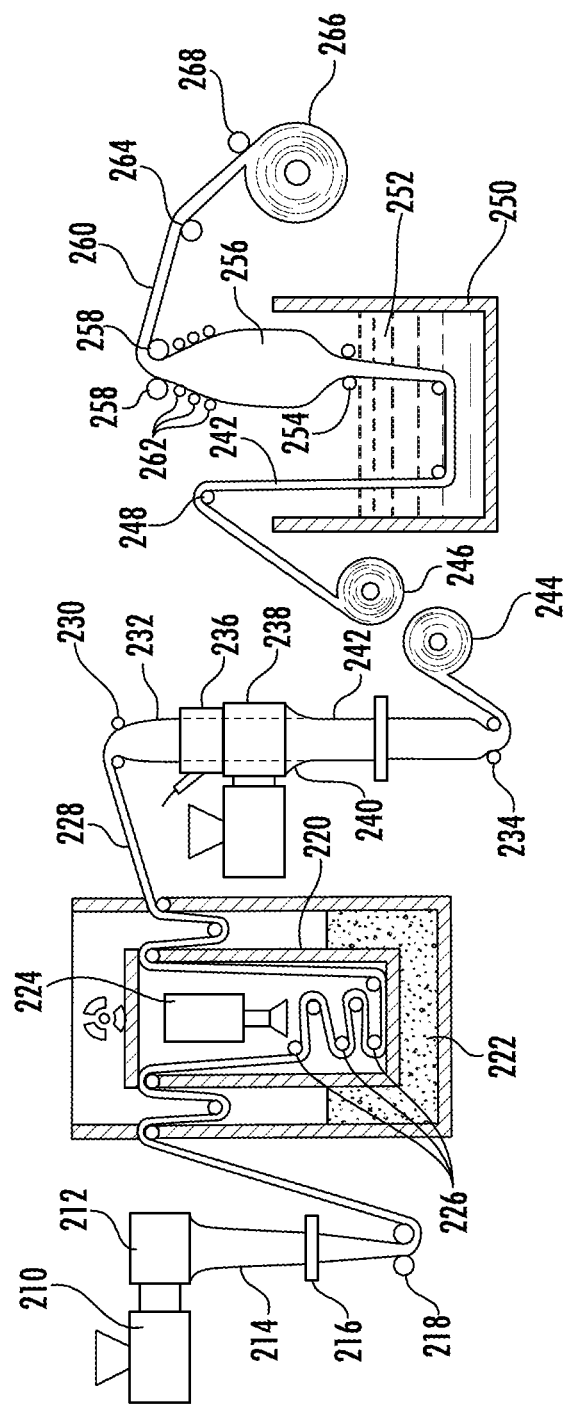
FIG. 15 is a schematic of a process used to make a heat-shrinkable film such as could be used to make a heat-shrinkable bag or for use in a flow wrap packaging process.

FIG. 15 illustrates a schematic of a preferred process for producing the multilayer heat-shrinkable film from which the packaging article can be made. In the process illustrated in FIG. 8, solid polymer beads (not illustrated) are fed to a plurality of extruders 210 (for simplicity, only one extruder is illustrated). Inside extruders 210, the polymer beads are forwarded, melted, and degassed, following which the resulting bubble-free melt is forwarded into die head 212, and extruded through an annular die, resulting in substrate tubing 214.

After cooling or quenching by water spray from cooling ring 216, tubing 214 is collapsed by pinch rolls 218, and is thereafter fed through irradiation vault 220 surrounded by shielding 222, where tubing 214 is irradiated with high energy electrons (i.e., ionizing radiation) from iron core transformer accelerator 224. Tubing 214 is guided through irradiation vault 220 on rolls 226. Preferably, tubing 214 is irradiated to a level of about 6.4 megarads (i.e., 64 kilograys, kGy).

After irradiation, irradiated tubing 228 is directed through nip rolls 230, following which tubing 228 is slightly inflated, resulting in trapped bubble 232. However, at trapped bubble 232, the tubing is not significantly drawn longitudinally, as the surface speed of nip rolls 234 are about the same speed as nip rolls 230. Furthermore, irradiated tubing 228 is inflated only enough to provide a substantially circular tubing without significant transverse orientation, i.e., without stretching.

Slightly inflated, irradiated tubing 232 is passed through vacuum chamber 236, and thereafter forwarded through coating die 238. Second tubular film 240 is melt extruded from coating die 238 and coated onto slightly inflated, irradiated tube 232, to form two-ply tubular film 242. Second tubular film 240 preferably comprises an $O_2$-barrier layer, which does not pass through the ionizing radiation.

The combined substrate and coating may have a thickness, before orientation, of from 10 to 30 mils, or from 15 to 25 mils. The substrate may have a thickness, before orientation, of from 6 to 18 mils, or from 9 to 15 mils. The coating may have a thickness, before orientation, of from 4 to 12 mils, or from 6 to 10 mils.

Further details of the above-described coating step are generally as set forth in U.S. Pat. No. 4,278,738, to BRAX et. al., which is hereby incorporated, in its entirety, by reference thereto.

After irradiation and coating, two-ply tubing film 252 may optionally be wound up onto windup roll 244, and thereafter installed as unwind roll 246, on a second stage in the process of making the tubing film as ultimately desired. Two-ply tubular film 242, from unwind roll 246, is unwound and passed over guide roll 248, after which two-ply tubular film 242 passes into hot water bath tank 250 containing hot water 252. [Alternatively, though not illustrated, the process can be uninterrupted by forwarding two-ply tubing film into hot water bath tank 250.] The now collapsed, irradiated, coated tubular film 242 is submersed in hot water 252 (having a temperature of about 210° F.) for a retention time of at least about 5 seconds, i.e., for a time period in order to bring irradiated tubular film 242 up to a desired softening temperature for biaxial orientation while irradiated tubular film 242 is in the solid state. Thereafter, irradiated tubular film 242 is directed through nip rolls 254, and bubble 256 is blown, thereby transversely stretching tubular film 242. Furthermore, while being blown, i.e., transversely stretched, nip rolls 258 draw tubular film 242 in the longitudinal direction, as nip rolls 258 have a surface speed higher than the surface speed of nip rolls 254.

As a result of the transverse stretching and longitudinal drawing, irradiated, coated biaxially-oriented blown tubing film 260 is produced, this blown tubing preferably having been both stretched in a ratio of from about 1:1.5-1:6, and drawn in a ratio of from about 1:1.5-1:6. More preferably, the stretching and drawing are each performed a ratio of from about 1:2-1:4. The result is a biaxial orientation of from about 1:2.25-1:36, more preferably, 1:4-1:16. While bubble 256 is maintained between pinch rolls 254 and 258, stretched tubing film 260 is collapsed by rolls 262, and thereafter conveyed through nip rolls 258 and across guide roll 264, and then rolled onto wind-up roll 266. Idler roll 268 assures a good wind-up. The resulting heat-shrinkable film tubing 260 can be used to make the packaging articles described herein.

Figure 16:
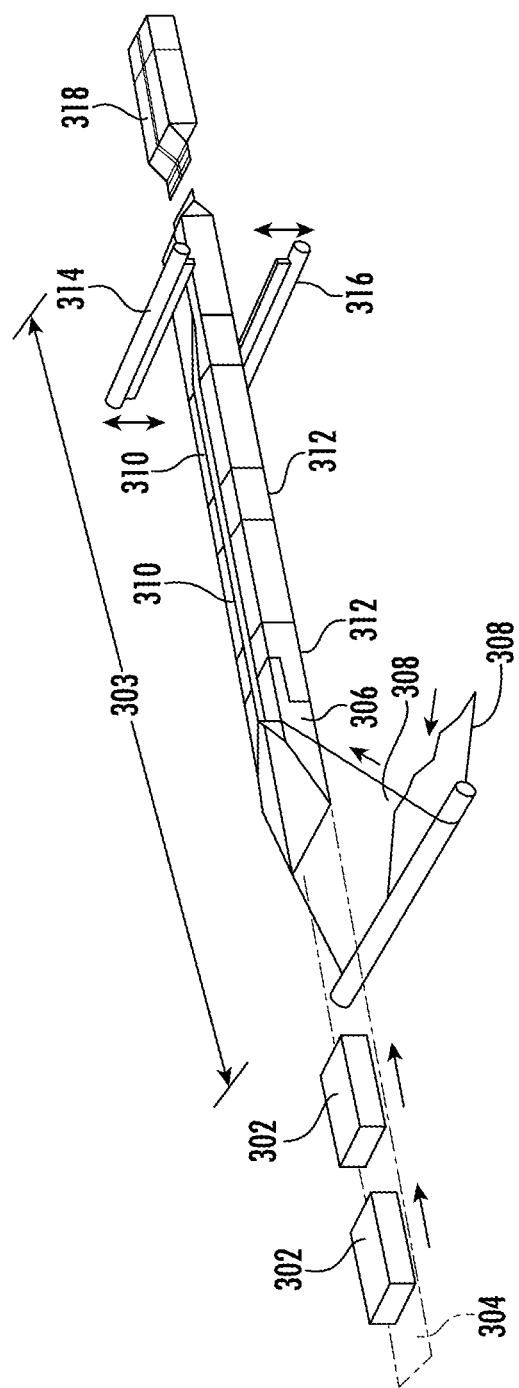
FIG. 16 is a schematic of horizontal flow wrap process for packaging products using a heat shrinkable film in accordance with the invention.

FIG. 16 illustrates the use of a heat-shrinkable film, such as the films of Table 2, below. The process illustrated in FIG. 16 is a type of horizontal form fill and seal process known in the packaging art as a "flow wrap" process. The process of FIG. 16 utilizes a continuous roll (not illustrated) of flat film to package a product in a packaging article as illustrated in FIGS. 8 and 9, or as in FIGS. 10 and 11, rather than in end-seal or side-seal bags, or pouches, as illustrated in FIGS. 1-7 and 12-14.

Although the process of FIG. 16 is at least theoretically capable of being run continuously, in actual use the process is intermittent, with different packagers having different frequency and duration of process interruption. The process of FIG. 16 does not produce a fully closed package. Rather, the product of the packaging operation illustrated in FIG. 16 results in a product inside the open packaging article illustrated in FIGS. 8-9 (described above), with the product inside the open packaging article being forwarded downstream to further machinery (described below) for completion of the packaging process.

In FIG. 16, products 302 are fed to packaging machine 303 via conveyor 304. Although product 302 can be any product to be packaged, a preferred product is a meat product, such as a roast, steak, chops, ribs, etc. Each product 302 can be an individual piece of meat or a plurality of pieces of meat.

Conveyor 304 terminates as the input end of forming horn 306. Product 302 is pushed into forming horn 306 by a pusher (not illustrated). Product 302 is pushed onto the upper surface of continuous strand of film 308 as product 302 is pushed into and through forming horn 306. Continuous strand of film 308 (supplied from a roll of film, not illustrated) is forwarded into, through, and past forming horn 306 as a continuous stream of products 302 are individually pushed into forming horn 306. Once on film 308, products 302 are forwarded through forming horn 306 by the forwarding of the strand of film 308, i.e., at the same speed that film 308 passes into, through, and beyond forming horn 306. Once on film 308, the forwarding of film 308 forwards products 302 therewith.

Film 308 is folded as it passes through forming horn 306, so that as product 302 emerges from forming horn 306, film 308 is folded around product 302, with product 302 now being inside a tube 312 of film 308. Above forming shoe 306, the edges of film 308 are folded upward and a sealing apparatus (not illustrated) forms a continuous fin-type heat seal 310 along the upwardly folded longitudinal edges of film 308. The heat seal can be formed using, for example, three sets of seal heads, i.e., three sets of heat sealing nip rollers. The first set (upstream) of heat sealing nip rollers can have a temperature of 65° C. The second set (middle) of heat sealing nip rollers can have a temperature of 90° C. The third set (downstream) of heat sealing nip rollers can have a temperature of 150° C. The head pressure of the seal heads was 2 bar. The web speed was 17.2 meters per minute. During the formation of backseam heat seal 310, film 308 surrounding products 302 is forwarded by a second conveyor (not illustrated) on which film 308 and products 302 rest.

During process interruption in which the flow of products is temporarily halted, the seal heads are pulled away from the film so that the film is not burned by a long period of contact with the hot seal heads. Upon resumption of the process, seal heads are reapplied to the film and the backseaming is continued. Of course, it is desirable that the package be provided with a strong backseam seal even if a portion of the backseam seal was made before process interruption and a portion of the backseam seal was made after process resumption. It is desirable that such a package exhibit a burst strength at least 95 percent as high as the burst strength of a package made from the same film but in which the backseam seal was continuously produced, i.e., without interruption. Alternatively, the package having a backseam with portions made before and after process interruption can have a burst strength of at least 90 percent, or at least 85 percent, or at least 80 percent, or at least 75 percent as high as the burst strength of a corresponding package in which the backseam was continuously produced, i.e., without interruption.

The stream of products 302 inside now sealed film tubing 312 is forwarded to a transverse sealer and cutter including upper sealer/cutter member 314 and lower sealer/cutter member 316, which work together to make transverse seals between products 302, and to cut film tubing 312 apart to produce individual packaged products 318. The temperatures for each of the two transverse seal bars in members 314 and 316 may be, for example, 105° C. and 105° C., with the seal bar dwell time being, for example, 350 milliseconds. Upper and lower sealer/cutter bars 314, 316 oscillate upward and downward as film tubing 312 is forwarded. Upon being sealed on the downstream end and cut free of the backseamed film tubing, the result is partially packaged product 318 having a backseam down its length, a closed bottom seal, and an open top end, as illustrated in FIGS. 8 and 9, described above.

Upon exiting packaging machine 303, partially packaged products 318 are forwarded to a vacuum chamber machine in which atmosphere is evacuated from inside the package and the open end of the package is heat sealed closed, so that the product is completely surrounded by the heat shrinkable packaging article. The resulting evacuated, closed packaged product is thereafter forwarded to a shrink machine in which the film is shrunk against the product by passing the evacuated, closed packaged product through a hot air tunnel or by immersing the evacuated, closed packaged product in a bath of hot water.

In an embodiment, the heat-shrinkable film exhibits an instrumented impact energy-to-break of at least 0.70 Joules/mil using ASTM D3763, or from 0.70 to 1.5 J/mil, or from 0.72 to 1.0 J/mil, or from 0.75 to 0.90 J/mil, or from 77 to 88 J/mil, or from 80 to 85 J/mil.

Instrumented Impact was carried out using ASTM D3763 (more particularly, ASTM D3763-15), which is hereby incorporated, in its entirety, by reference thereto. Instrumented Impact analysis was carried out with 3.66 m/sec velocity and with a 12.7 mm diameter spherical probe. ASTM D3763-15 is hereby incorporated, in its entirety, by reference thereto.

The heat-shrinkable film can have a Peak Load Impact Strength, determined using ASTM 3763-95A, of at least 77 Newtons per mil, or from 77 to 150 Newtons per mil (N/mil), or from 78 to 120 N/mil or from 80 to 100 N/mil, or from 80 to 90 N/mil, or from 80 to 85 N/mil. ASTM 3763-95A is hereby incorporated, in its entirety, by reference thereto.

Figure 17:
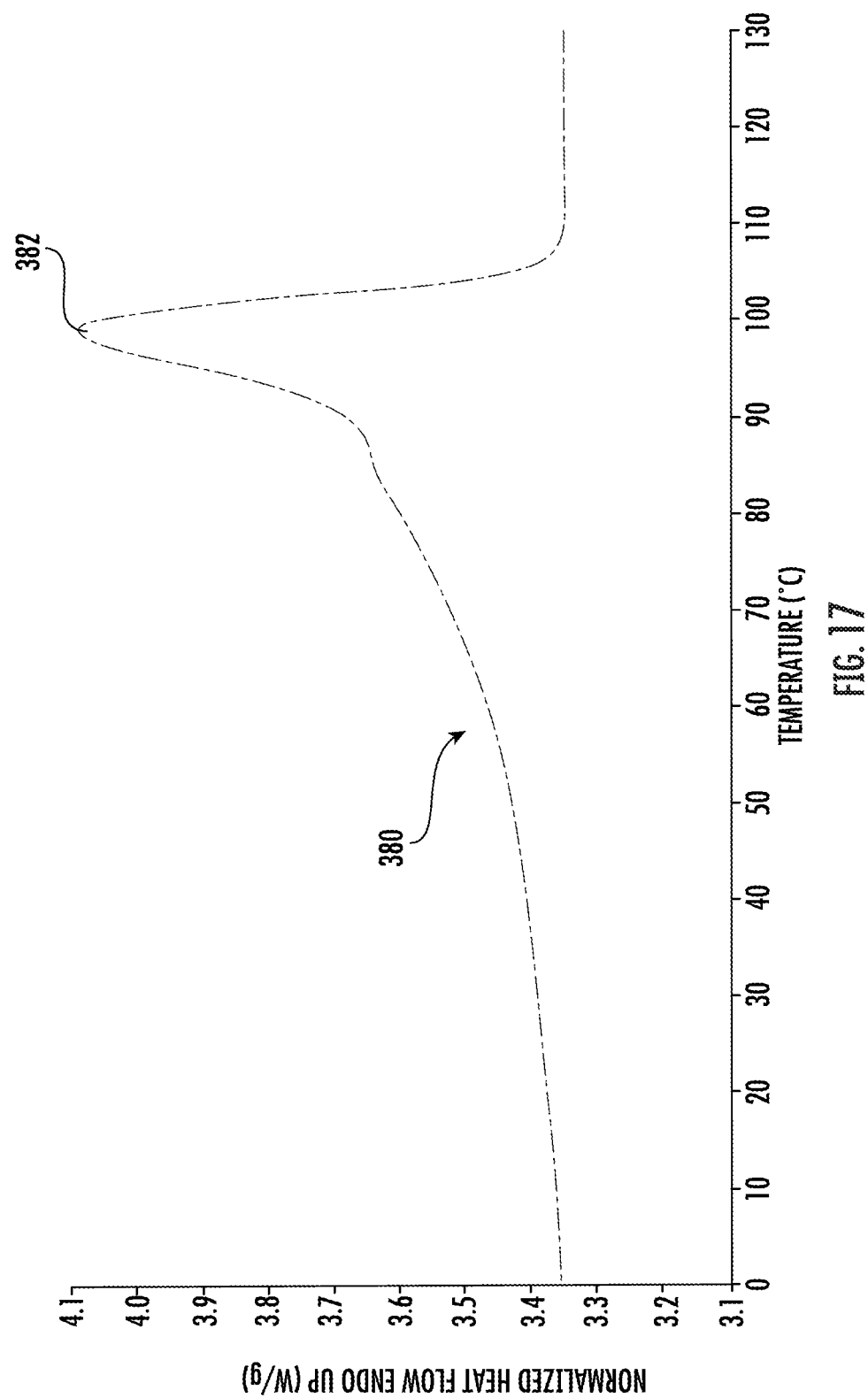
FIG. 17 is a differential scanning calorimetry curve of SSPE1 (single site catalyzed ethylene/alpha-olefin copolymer) disclosed in Table 1, below.

FIG. 17 is a differential scanning calorimetry (DSC) curve 380 of SSPE1, disclosed in Table 1, below. The curve represents the uptake of heat (Y axis) as a function of polymer temperature (X axis). This DSC curve was generated by: (i) holding the polymer sample at a temperature of 30° C. for one minute, then (ii) heating the polymer sample from 30° C. to 147° C. at 10° C./min, then (iii) holding the sample 147° C. for 1 min, then (iv) cooling the sample from 147° C. to −43° C. at 10° C./min, then (iv) holding the sample at −43° C. for one minute, then (v) heating the sample from −40° C. to 147° C. at 10° C./min. at the polymer is heated (single site catalyzed ethylene/alpha-olefin copolymer) disclosed in Table 1, below. Thus, the DSC curve in FIG. 26 is the plot of the "second heating" of the sample. The peak melting point of SSPE1 is located at peak 382, which corresponds with 98.32° C.

Figure 18:
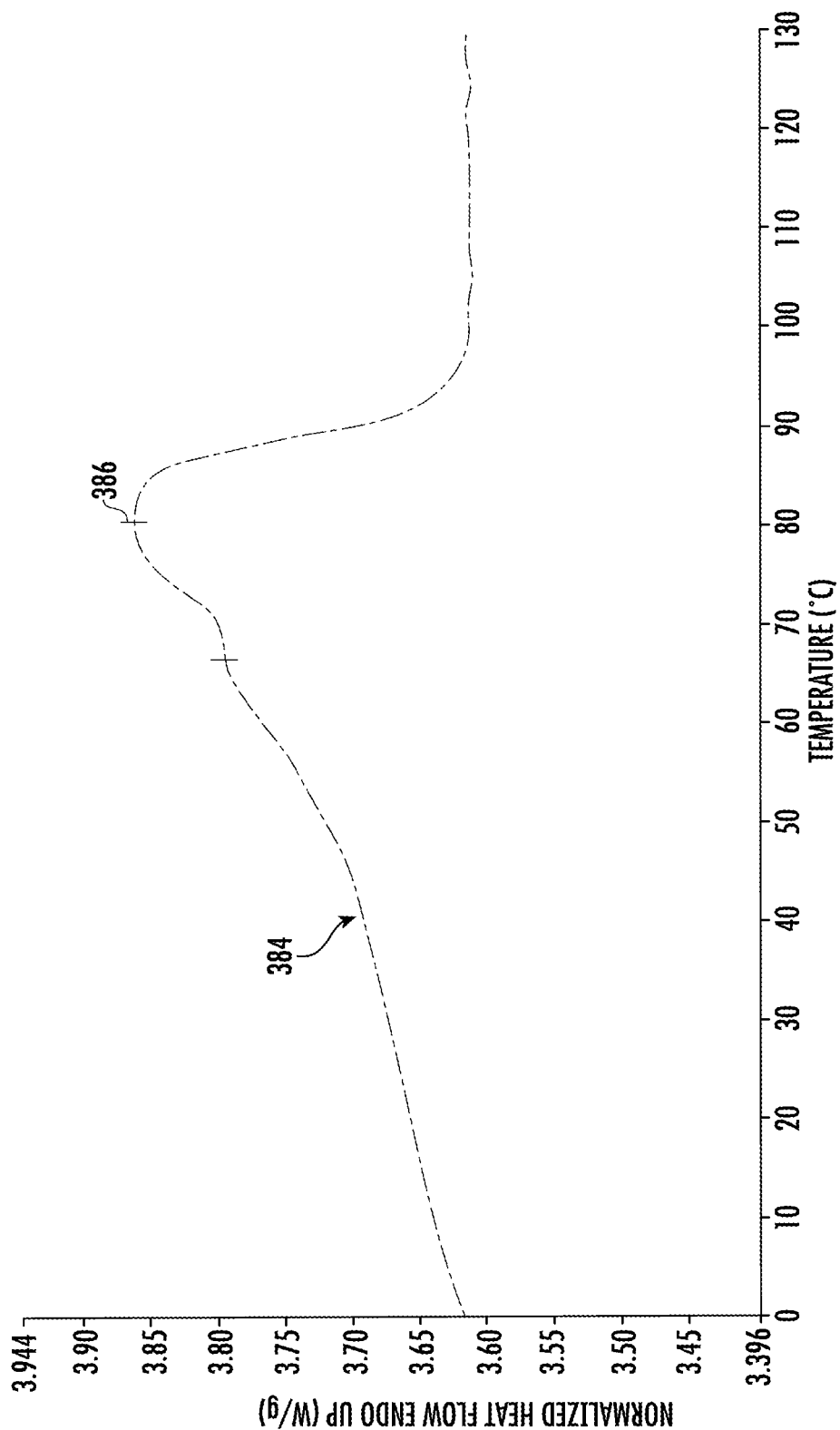
FIG. 18 is a differential scanning calorimetry curve of PLAS1 (ethylene/alpha-olefin plastomer) disclosed in Table 1, below.

FIG. 18 is a DSC curve 384 of PLAS1, also disclosed in Table 1, below. This DSC curve was generated using the same procedure set forth for SSPE1 illustrated in FIG. 17, described above. The peak melting point of PLAS1 is located at peak 386, which corresponds with 80.42° C.

Figure 19:
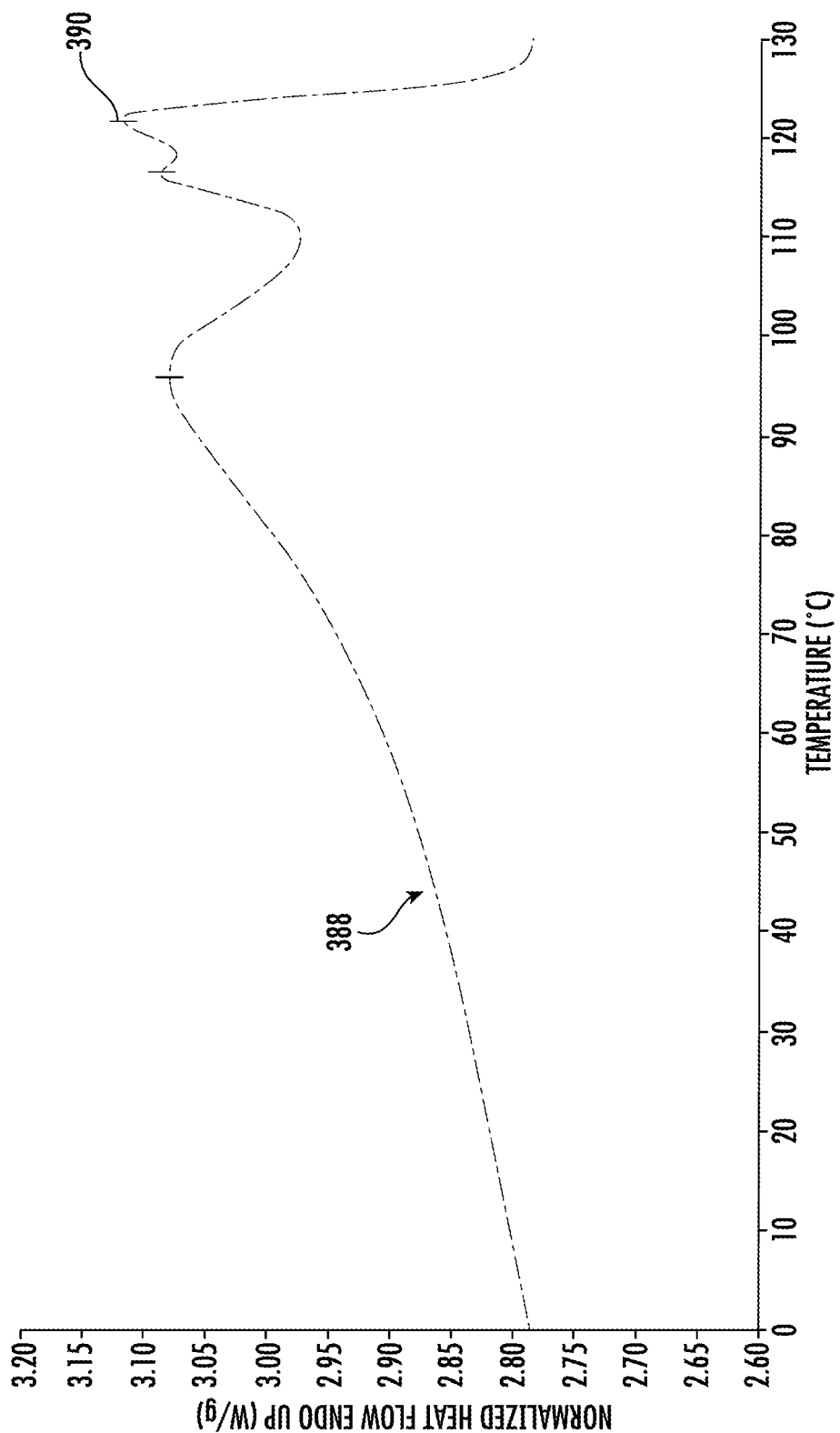
FIG. 19 is a differential scanning calorimetry curve of VLDPE1 (very low density ethylene/alpha-olefin copolymer) disclosed in Table 1, below.

FIG. 19 is a DSC curve 388 of VLDPE1, also disclosed in Table 1, below. This DSC curve was generated using the same procedure set forth for SSPE1 illustrated in FIG. 17, described above. The peak melting point of VLDPE1 is located at peak 390, which corresponds with 121.74° C.

Examples

TABLE 1

Resins and Other Compositions used in the Examples

| Resin code | Trade name | Generic Resin Name {additional information} | Density (g/cc) | Melt Index (dg/min) | Supplier |
|---|---|---|---|---|---|
| SSPE 1 | AFFINITY ® PL 1281G1 | homogeneous ethylene/octene copolymer | 0.900 g/cc mp: 99° C. | 6.0 | Dow |
| SSPE2 | AFFINITY ® PL 1880G | homogeneous ethylene/octene copolymer | 0.902 g/cc | 1.1 | Dow |
| SSPE3 | EXACT ® 3128 | homogeneous ethylene/butene copolymer | 0.900 g/cc | 1.3 | Exxon Mobil |
| SSPE4 | AFFINITY ® PL 1850G | homogeneous ethylene/octene copolymer | 0.902 g/cc | 3.0 | Dow |
| SSPE5 | EXCEED ® 1012HJ | homogeneous ethylene/hexene copolymer | 0.912 g/cc | 1.0 | Exxon Mobil |
| ssPE6 | EXCEED ® XP 8318XX | homogeneous ethylene/alpha-olefin copolymer | 0.918 g/cc | 1.0 | Exxon Mobil |

TABLE 1-continued

Resins and Other Compositions used in the Examples

| Resin code | Trade name | Generic Resin Name {additional information} | Density (g/cc) | Melt Index (dg/min) | Supplier |
|---|---|---|---|---|---|
| ssPE7 | EXCEED ® XP 8358XX | homogeneous ethylene/alpha-olefin copolymer | 0.918 g/cc | 0.5 | Exxon Mobil |
| PLAS1 | ENGAGE ® 8003 | homogeneous ethylene/octene plastomer | 0.885 g/cc mp: 77° C. | 1 | Dow |
| PLAS2 | ENGAGE ® 8157 | homogeneous ethylene/octene copolymer | 0.868 mp: 55° C. | 0.50 | Dow |
| VLDPE1 | XUS 61520.15L | heterogeneous ethylene/alpha-olefin copolymer | 0.903 | 0.5 | Dow |
| VLDPE2 | ATTANE 4203 | heterogeneous ethylene/alpha-olefin copolymer | 0.905 | 8.6 | Dow |
| LLDPE 1 | DOWLEX ® 2045.03 | Heterogeneous linear low density polyethylene | 0.920 | 1.1 | Dow |
| LLDPE 2 | LL 3003.32 | heterogeneous ethylene/hexene copolymer | 0.9175 | 3.2 | Exxon Mobil |
| LLDPE 3 | XUS 61520.21 | Heterogeneous linear low density polyethylene | 0.903 | 0.5 | Dow |
| EPC | VISTAMAXX ® 3588FL | homogeneous propylene/ethylene copolymer (8% ethylene) | 0.889 | 8 | Exxon Mobil |
| EPDM | VISTALON ® 7800 | ethylene/propylene/diene monomer | n/a | n/a | Exxon Mobil |
| ION | SURLYN ® 1702-1 | ionomer resin (16% methacrylic acid) | 0.950 | 14.00 | DuPont |
| EVA 1 | EB524AA | ethylene/vinyl acetate copolymer (14.5% vinyl acetate) | 0.934 | 3.5 | Westlake Chemical |
| EVA 2 | ESCORENE ® LD 716.36 | ethylene/vinyl acetate copolymer (26.7% vinyl acetate) | 0.951 | 5.75 | Exxon Mobil |
| EVA3 | EF528AA | ethylene/vinyl acetate copolymer (18.5% vinyl acetate) | 0.940 | 2.5 | Westlake Chemical |
| EVA4 | EB592AA | ethylene/vinyl acetate copolymer (9% vinyl acetate) | 0.931 | 2.0 | Westlake Chemical |
| EVA5 | ESCORENE ® LD 720.92 | ethylene/vinyl acetate copolymer (18.5% vinyl acetate) | 0.940 | 1.55 | Exxon Mobil |
| mEVA | BYNEL ® 3101 | acid/acrylate modified ethylene/vinyl acetate copolymer tie adhesive (18.4% vinyl acetate) | 0.943 | 3.2 | DuPont |
| PVDC1 | IXAN ® PV910 | vinylidene chloride/methyl acrylate copolymer | 1.71 | — | Solvin |
| PVDC2 | SARAN ® 806 | vinylidene chloride/methyl acrylate copolymer | 1.70 | — | Dow |
| PA1 | ULTRAMID ® RX2267 | Polyamide 6/66 | 1.135 | 181° C. mp | BASF |
| PA2 | ULTRAMID ® C40 01 | Polyamide 6/66 | 1.12 | 190° C. mp | BASF |
| coPET1 | EASTAPAK ® COPOLYESTER 9921 | polyethylene terephthalate | 1.40 | 255° C. melt point | Eastman Chemical |
| coPET2 | EASTMAN COPOLYESTER EN058 | polyester | 1.40 | Intrinsic viscosity 0.6 mPa sec | Eastman Chemical |
| PET3 | POLYCLEAR ® PET 5704 | Polyester | 52 lb/ft³ | Intrinsic viscosity 0.72 mPa sec | Indorama |
| PETG4 | ASPIRA ® COPOLYESTER EB062 | polyethylene terephthalate/glycol | 1.25 g/cc | n/a | Eastman Chemical |
| PETG5 | EMBRACE ® LV copolyester | polyethylene terephthalate/glycol | 1.30 g/cc | Inherent viscosity 0.70 mPa sec | Eastman Chemical |
| PETG6 | GN001 | polyethylene terephthalate/glycol | 1.27 g/cc | Intrinsic viscosity 0.75 dl/g | Eastman Chemical |
| EMA-1 | ELVALOY ® AC 1218 | ethylene/methyl acrylate copolymer (18% vinyl acetate) | 0.940 | 2 | DuPont |
| EMA-2 | EMAC ® SP2402 | ethylene/methyl acrylate copolymer (18.5% vinyl acetate) | 0.941 | 2.5 | Westlake Chemical |
| MB1 | 89% LLDPE 3.5% erucamide; 3.5% N,N'-ethylene-bis-stearamide; 4% sodium aluminosilicate antiblock | Blended masterbatch | — | — | Prepared in-house |
| MB2 | ATMER ® 7540 | Slip masterbatch | — | — | Croda |
| MB3 | 89% LLDPE 3.5% erucamide; 3.5% N,N'-ethylene-bis-stearamide; 4% sodium aluminosilicate antiblock | Polyethylene homopolymer antiblock and slip agent | — | — | Prepared in-house |

TABLE 1-continued

Resins and Other Compositions used in the Examples

| Resin code | Trade name | Generic Resin Name {additional information} | Density (g/cc) | Melt Index (dg/min) | Supplier |
|---|---|---|---|---|---|
| MB4 | SILOXANE MB50-10 | Polyester with siloxane additive | n/a | n/a | Dow Corning |

Each of the films below was produced (unless indicated as prophetic) using the extrusion coating process illustrated in FIG. 15, described above. The resins used in each layer are as identified in the table above. The orientation was carried out by passing the tape through a 198° F. to 202° F. water bath for a period of about 20 seconds. The coated tape was oriented in the solid state to the maximum which could be obtained without causing an impractical level of bubble breaks, with the total orientation (MD×TD) of from about 10× to about 13×, e.g., about 3.4× in each direction.

Unless otherwise indicated, in the various film tables below the films designated with the suffix "I" had substrate sections which were irradiated at 64 kGy. Films designated with the suffix "N" had substrate sections which were not subjected to irradiation. None of the coating sections were subjected to irradiation. The narrow empty column in each table separates the substrate section from the coating section. The substrate includes all layers to the left of the empty column; the coating includes all layers to the right of the empty column.

Film 1I (working)

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 64 kGy | | | | 0 kGy | | | |
| 80 SSPE1 20 LLDPE2 | 55 VLDPE1 15 PLAS1 30 EVA1 | | EVA2 | PVDC1 | EVA2 | mEVA | coPET1 |
| 0.3 mil | 0.73 mil | | 0.11 mil | 0.18 mil | 0.09 mil | 0.14 mil | 0.11 mil |

Film 1N (comparative)

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 0 kGy | | | | 0 kGy | | | |
| 80 SSPE1 20 LLDPE2 | 55 VLDPE1 15 PLAS1 30 EVA1 | | EVA2 | PVDC1 | EVA2 | mEVA | coPET1 |
| 0.3 mil | 0.73 mil | | 0.11 mil | 0.18 mil | 0.09 mil | 0.14 mil | 0.11 mil |

Film 2I

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 64 kGy | | | | 0 kGy | | | |
| 80 SSPE1 20 LLDPE2 | 60 VLDPE1 40 EVA1 | | EVA2 | PVDC1 | EVA2 | mEVA | coPET1 |
| 0.3 mil | 0.73 mil | | 0.11 mil | 0.18 mil | 0.09 mil | 0.14 mil | 0.11 mil |

Film 2N

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 0 kGy | | | | 0 kGy | | | |
| 80 SSPE1 20 LLDPE2 | 60 VLDPE1 40 EVA1 | | EVA2 | PVDC1 | EVA2 | mEVA | coPET1 |
| 0.3 mil | 0.73 mil | | 0.11 mil | 0.18 mil | 0.09 mil | 0.14 mil | 0.11 mil |

Film 3I & Film 3N

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 80 SSPE1 20 LLDPE2 | 60 VLDPE1 40 EMA1 | | EVA2 | PVDC1 | EVA2 | mEVA | coPET1 |
| 0.3 mil | 0.73 mil | | 0.11 mil | 0.18 mil | 0.09 mil | 0.14 mil | 0.11 mil |

Film 4I & Film 4N

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 80 SSPE1 20 LLDPE2 | 60 VLDPE1 40 EVA1 | | EMA-1 | PVDC1 | EMA-1 | mEVA | coPET1 |
| 0.3 mil | 0.73 mil | | 0.11 mil | 0.18 mil | 0.09 mil | 0.14 mil | 0.11 mil |

Film 5I & Film 5N

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| 80 SSPE1 20 LLDPE2 | 60 VLDPE1 40 EMA-1 | | EMA-1 | PVDC1 | EMA-1 | mEVA | coPET1 |
| 0.3 mil | 0.73 mil | | 0.11 mil | 0.18 mil | 0.09 mil | 0.14 mil | 0.11 mil |

Film 6I & Film 6N

| Layer 1 | Layer 2 | | Layer 3 | Layer 4 | Layer 5 | Layer 6 | Layer 7 |
|---|---|---|---|---|---|---|---|
| Sealant | Core | | Tie #1 | Barrier | Tie #2 | Tie #3 | Abuse |
| Substrate Section | | | | Coating Section | | | |
| ION | 60 VLDPE1 40 EMA-1 | | EMA-1 | PVDC1 | EMA-1 | mEVA | coPET1 |
| 0.3 mil | 0.73 mil | | 0.11 mil | 0.18 mil | 0.09 mil | 0.14 mil | 0.11 mil |

Film 7I & Film 7N

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse Coating Section |
| 80 SSPE1 20 LLDPE2 | 60 VLDPE1 40 EMA-1 | EMA-1 | PVDC1 | EMA-1 | mEVA | 50 coPET1 50 coPET2 |
| 0.3 mil | 0.73 mil | 0.11 mil | 0.18 mil | 0.09 mil | 0.14 mil | 0.11 mil |

Film 8I & Film 8N

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse Coating Section |
| 80 SSPE1 20 LLDPE2 | 60 VLDPE1 40 EMA-2 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

Film 9I & Film 9N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 | Tie #3 | Abuse Coating Section |
| 80 SSPE1 20 LLDPE2 | 55 VLDPE1 15 PLAS1 30 EVA1 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

Film 10I & Film 10N

| Layer 1 | Layer 2 | Layer 3 | Layer 4 | Layer 5 | Layer 6 | Layer 7 |
|---|---|---|---|---|---|---|
| Sealant Substrate Section | Core | Tie #1 | Barrier | Tie #2 | Tie #3 | Abuse Coating Section |
| ION | 55 VLDPE1 15 PLAS1 30 EVA1 | EMA-2 | PVDC1 | EMA-2 | mEVA | coPET1 |
| 0.3 mil | 0.73 mil | 0.11 mil | 0.18 mil | 0.09 mil | 0.14 mil | 0.11 mil |

Film 11N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

Film 12N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | 50 coPET1 50 coPET2 |
| 0.3 mil | 0.5 mil | 0.11 | 0.18 mil | 0.09 | 0.09 mil | 0.25 | 0.11 mil | 0.11 mil |

Film 13N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 20 LLDPE2 | 70 VLDPE1 30 EVA1 | EVA 2 | PVDC1 | EVA 2 | EVA-2 | 70 VLDPE1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| Film 14N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | 99 coPET1 1 EMA-1 |
| 0.3 mil | 0.5 mil | 0.11 | 0.18 mil | 0.09 | 0.09 mil | 0.25 | 0.11 mil | 0.11 mil |

| Film 15N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 40 VLDPE1 30 PLAS1 30 EVA1 | EVA 2 | PVDC1 | EVA 2 | EVA-2 | 40 VLDPE1 30 PLAS1 30 EVA1 | mEVA | 50 coPET1 50 coPET2 |
| 0.3 mil | 0.5 mil | 0.11 | 0.18 mil | 0.09 | 0.09 mil | 0.25 | 0.11 mil | 0.11 mil |

| Film 16N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 MB1 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| Film 17N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 LLDPE3 20 SSPE1 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| Film 20N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE2 20 SSPE1 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| Film 21N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | PA1 |
| 0.3 mil | 0.5 mil | 0.11 | 0.18 mil | 0.09 | 0.09 mil | 0.25 | 0.11 mil | 0.11 mil |

| Film 22N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | PA2 |
| 0.3 mil | 0.5 mil | 0.11 | 0.18 mil | 0.09 | 0.09 mil | 0.25 | 0.11 mil | 0.11 mil |

| Film 23N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE3 20 EVA4 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 | 0.11 mil | 0.11 mil |

| Film 24I & Film 24N | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 VLDPE1 15PLAS1 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

| Film 20I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | 50 coPET1 48 coPET2 2 MB2 |
| 0.3 mil | 0.73 mil | 0.11 mil | 0.18 mil | 0.09 mil | 0.14 mil | 0.11 mil |

| Film 25I & 25N | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | 50 coPET1 49 coPET2 1 MB2 |
| 0.3 mil | 0.73 mil | 0.11 mil | 0.18 mil | 0.09 mil | 0.14 mil | 0.11 mil |

| Film 27I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

| Film 28I & Film 28N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 70 SSPE2 30 EVA1 | 70 EVA2 30 PLAS1 | PVDC1 | 70 EVA2 30 PLAS1 | mEVA | 50 coPET1 50 coPET2 |
| 0.3 mil | 0.73 mil | 0.11 mil | 0.18 mil | 0.09 mil | 0.14 mil | 0.11 mil |

| Film 29I & Film 29N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 70 VLDPE1 30 EVA1 | EVA2 | PVDC1 | EVA2 | mEVA | 50 coPET1 49 coPET2 1 MB2 |
| 0.3 mil | 0.73 mil | 0.11 mil | 0.18 mil | 0.09 mil | 0.14 mil | 0.11 mil |

| Film 30I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PET3 |
| 0.3 mil | 0.73 mil | 0.11 mil | 0.18 mil | 0.09 mil | 0.14 mil | 0.11 mil |

| Film 31I (prophetic) | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PETG4 |
| 0.3 mil | 0.73 mil | 0.11 mil | 0.18 mil | 0.09 mil | 0.14 mil | 0.11 mil |

| Film 32I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 55 SSPE2 15 PLAS1 30 EVA1 | EVA2 | PVDC1 | EVA2 | mEVA | PETG5 |
| 0.3 mil | 0.73 mil | 0.11 mil | 0.18 mil | 0.09 mil | 0.14 mil | 0.11 mil |

| Film 33I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 | 55 SSPE2 | EVA1 | PVDC1 | EVA2 | mEVA | 50 |

-continued

| Film 33I | | | | | | |
|---|---|---|---|---|---|---|
| Layer 1 | Layer 2 | Layer 3 | Layer 4 | Layer 5 | Layer 6 | Layer 7 |
| 20 LLDPE2 | 15 PLAS1 30 EVA1 | | | | | coPET1 50 coPET2 |
| 0.3 mil | 0.73 mil | 0.11 mil | 0.18 mil | 0.09 mil | 0.14 mil | 0.11 mil |

| Film 34N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 55 VLDPE1 15 PLAS1 30 EVA1 | EVA2 | PVDC1 | EVA2 | mEVA | coPET2 |
| 0.3 mil | 0.74 mil | 0.10 mil | 0.19 mil | 0.10 mil | 0.13 mil | 0.11 mil |

| Film 35I & Film 35N | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 70 SSPE2 30 EVA1 | EVA2 | PVDC1 | EVA2 | mEVA | 50 coPET1 50 coPET2 |
| 0.3 mil | 0.73 mil | 0.11 mil | 0.18 mil | 0.09 mil | 0.14 mil | 0.11 mil |

| Film 36I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 MB3 | 55 VLDPE1 15 PLAS1 30 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

| Film 38I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 Coating Section | Tie #3 | Abuse |
| 80 SSPE1 20 LLDPE2 | 60 VLDPE1 10 EPDM 30 EVA1 | EVA2 | PVDC1 | EVA2 | mEVA | coPET1 |
| 0.3 mil | 0.73 mil | 0.11 mil | 0.18 mil | 0.09 mil | 0.14 mil | 0.11 mil |

Film 37I

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse |
|  |  |  | Coating Section |  |  |  |
| 80 SSPE1 20 MB3 | 55 VLDPE1 15 PLAS1 30 EVA1 | EVA-2 | PVDC1 | EVA-2 | mEVA | PET3 |
| 0.3 mil | 0.73 mil | 0.11 mil | 0.18 mil | 0.09 mil | 0.14 mil | 0.11 mil |

Film 40I

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse |
|  |  |  | Coating Section |  |  |  |
| 80 SSPE1 20 MB3 | 55 VLDPE1 15 PLAS1 30 EVA1 | EVA2 | PVDC1 | EVA2 | mEVA | 80 SSPE4 20 LLDPE1 |
| 0.3 mil | 0.73 mil | 0.11 mil | 0.18 mil | 0.09 mil | 0.14 mil | 0.11 mil |

Film 39I

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse |
|  |  |  | Coating Section |  |  |  |
| 80 SSPE1 20 MB3 | 55 VLDPE1 15 PLAS1 30 EVA1 | EVA2 | PVDC1 | EVA2 | mEVA | 99 coPET1 1 MB4 |
| 0.3 mil | 0.73 mil | 0.11 mil | 0.18 mil | 0.09 mil | 0.14 mil | 0.11 mil |

Film 41I

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse |
|  |  |  | Coating Section |  |  |  |
| 80 SSPE1 20 MB3 | 55 VLDPE1 15 EPDM 30 EVA1 | EVA1 | PVDC1 | EVA1 | mEVA | 99 coPET1 1 MB2 |
| 0.3 mil | 0.73 mil | 0.11 mil | 0.18 mil | 0.09 mil | 0.14 mil | 0.11 mil |

Film 43N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 20 MB3 | 55 VLDPE1 15 PLAS1 30 EVA1 | EVA 2 | PVDC1 | EVA 2 | EVA-2 | 55 VLDPE1 15 PLAS1 30 EVA1 | mEVA | coPET1 |
| 0.3 mil | 0.5 mil | 0.11 | 0.18 mil | 0.09 | 0.09 mil | 0.25 mil | 0.11 mil | 0.11 mil |

Film 42I

| Layer 1 | Layer 2 | Layer 3 | Layer 4 | Layer 5 | Layer 6 | Layer 7 |
|---|---|---|---|---|---|---|
| Sealant | Core Section | Tie #1 | Barrier | Tie #2 | Tie #3 | Abuse |
|  |  |  | Coating Section |  |  |  |
| 80 SSPE1 20 LLDPE2 | 60 VLDPE1 10 EPDM 30 EVA-1 | EVA-2 | PVDC1 | EVA-2 | mEVA | 99 coPET1 1 MB2 |
| 0.3 mil | 0.73 mil | 0.11 mil | 0.18 mil | 0.09 mil | 0.14 mil | 0.11 mil |

Film 44N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 20 MB3 | 55 VLDPE1 15 PLAS1 30 EVA1 | EVA 2 | PVDC1 | EVA 2 | EVA-2 | 55 VLDPE1 15 PLAS1 30 EVA1 | mEVA | 99 coPET1 1 MB2 |
| 0.3 mil | 0.5 mil | 0.11 | 0.18 mil | 0.09 | 0.09 mil | 0.25 mil | 0.11 mil | 0.11 mil |

Film 45N

| Layer 1 | Layer 2 | Layer 3 | Layer 4 | Layer 5 | Layer 6 | Layer 7 | Layer 8 | Layer 9 |
|---|---|---|---|---|---|---|---|---|
| Sealant | Core Substrate | Tie #1 | Barrier | Tie #2 | Tie #3 | Core Coating | Tie #3 | Abuse |
| 80 SSPE1 | 55 VLDPE1 | EVA 1 | PVDC1 | EVA 1 | EVA-1 | 55 VLDPE1 | mEVA | coPET1 |

-continued

| | | | | Film 45N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| 20 LLDPE2 | 15 PLAS1 | | | | | 15 PLAS1 | | |
| | 30 EVA1 | | | | | 30 EVA1 | | |
| 0.3 mil | 0.5 mil | 0.11 | 0.18 mil | 0.09 | 0.09 mil | 0.25 mil | 0.11 mil | 0.11 mil |

| | | | | Film 46N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 | 55 SSPE2 | EVA 1 | PVDC1 | EVA 1 | EVA-1 | 55 SSPE2 | mEVA | coPET 1 |
| 20 LLDPE2 | 15 PLAS1 | | | | | 15 PLAS1 | | |
| | 30 EVA1 | | | | | 30 EVA1 | | |
| 0.3 mil | 0.5 mil | 0.11 | 0.18 mil | 0.09 | 0.09 mil | 0.25 mil | 0.11 mil | 0.11 mil |

| | | | | Film 47N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 | 70 VLDPE1 | EVA 2 | PVDC1 | EVA 2 | EVA-2 | 70 VLDPE1 | mEVA | coPET1 |
| 20 MB3 | 30 EVA1 | | | | | 30 EVA1 | | |
| 0.3 mil | 0.5 mil | 0.11 | 0.18 mil | 0.09 | 0.09 mil | 0.25 mil | 0.11 mil | 0.11 mil |

| | | | | Film 48N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | PETG4 |
| 20 LLDPE2 | 15 PLAS1 | | | | | 15 PLAS1 | | |
| | 30 EVA1 | | | | | 30 EVA1 | | |
| 0.3 mil | 0.5 mil | 0.11 | 0.18 mil | 0.09 | 0.09 mil | 0.25 mil | 0.11 mil | 0.11 mil |

| | | | | Film 49N | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 | 55 VLDPE1 | EVA 2 | PVDC1 | EVA 2 | EVA-2 | 55 VLDPE1 | mEVA | PETG5 |
| 20 LLDPE2 | 15 PLAS1 | | | | | 15 PLAS1 | | |
| | 30 EVA1 | | | | | 30 EVA1 | | |
| 0.3 mil | 0.5 mil | 0.11 | 0.18 mil | 0.09 | 0.09 mil | 0.25 mil | 0.11 mil | 0.11 mil |

| Film 50N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | EVA-2 | 55 VLDPE1 15 PLAS1 30 EVA1 | mEVA | 99 coPET1 1 MB4 |
| 0.3 mil | 0.5 mil | 0.11 | 0.18 mil | 0.09 | 0.09 mil | 0.25 mil | 0.11 mil | 0.11 mil |

| Film 51N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | coPET1 |
| 0.3 mil | 0.47 mil | 0.11 | 0.18 mil | 0.09 | 0.09 mil | 0.25 mil | 0.11 mil | 0.11 mil |

| Film 52N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

| Film 53N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA 2 | PVDC1 | EVA 2 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

| Film 54N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core Substrate | Tie #1 | Barrier | Tie #2 | Tie #3 | Core Coating | Tie #3 | Abuse |
| 80 SSPE1 20 LLDPE2 | 55 VLDPE1 15 PLAS1 30 EVA1 | EVA1 | PVDC1 | EVA 1 | mEVA | 55 VLDPE1 15 PLAS1 30 EVA1 | mEVA | PET3 |
| 0.3 mil | 0.47 mil | 0.11 | 0.18 mil | 0.09 | 0.09 mil | 0.25 mil | 0.11 mil | 0.11 mil |

| Film 55N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA 1 | PVDC1 | EVA 1 | mEVA | 60 VLDPE1 40 EVA1 | mEVA | PET3 |
| 0.3 mil | 0.47 mil | 0.11 | 0.18 mil | 0.09 | 0.09 mil | 0.25 mil | 0.11 mil | 0.11 mil |

| Film 56N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA 1 | PVDC1 | EVA 1 | mEVA | PETG5 | mEVA | PET3 |
| 0.3 mil | 0.47 mil | 0.11 | 0.18 mil | 0.09 | 0.09 mil | 0.25 mil | 0.11 mil | 0.11 mil |

| Film 57N | | | | | | | | |
|---|---|---|---|---|---|---|---|---|
| Layer 1 | Layer 2 | Layer 3 | Layer 4 | Layer 5 | Layer 6 | Layer 7 | Layer 8 | Layer 9 |
| Sealant | Core | Tie #1 Substrate | Barrier | Tie #2 | Tie #3 | Core Coating | Tie #3 | Abuse |
| 80 SSPE1 20 MB3 | 60 VLDPE1 40 EVA1 | EVA1 | PVDC1 | EVA1 | mEVA | 60 VLDPE1 40 EVA1 | mEVA | PET3 |
| 0.3 mil | 0.47 mil | 0.11 | 0.18 mil | 0.09 | 0.09 mil | 0.25 mil | 0.11 mil | 0.11 mil |

| Film 58I & Film 58N | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 | Tie #3 Coating Section | Abuse |
| 80 SSPE1 20 LLDPE2 | 70 SSPE5 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

| Film 59I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 | Tie #3 Coating Section | Abuse |
| 80 SSPE1 20 LLDPE2 | 55 SSPE5 15 PLAS1 30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

| Film 60I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 | Tie #3 Coating Section | Abuse |
| 80 SSPE1 20 LLDPE2 | 70 VLDPE1 30 EVA1 | EVA-2 | PVDC1 | EVA-2 | mEVA | 80 SSPE1 20 LLDPE2 |
| 0.3 mil | 0.73 mil | 0.11 mil | 0.18 mil | 0.09 mil | 0.14 mil | 0.11 mil |

-continued

| Film 61I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 | Tie #3 Coating Section | Abuse |
| 80 SSPE1 20 LLDPE2 | 70 SSPE6 30 EVA1 | EVA-2 | PVDC1 | EVA-2 | mEVA | 80 SSPE1 20 LLDPE2 |
| 0.3 mil | 0.73 mil | 0.11 mil | 0.18 mil | 0.09 mil | 0.14 mil | 0.11 mil |

| Film 62I | | | | | | |
|---|---|---|---|---|---|---|
| Layer 1 | Layer 2 | Layer 3 | Layer 4 | Layer 5 | Layer 6 | Layer 7 |
| Sealant Substrate Section | Core | Tie #1 | Barrier | Tie #2 | Tie #3 Coating Section | Abuse |
| 80 SSPE1 20 LLDPE2 | 70 SSPE7 30 EVA1 | EVA-2 | PVDC1 | EVA-2 | mEVA | 80 SSPE4 20 LLDPE1 |
| 0.3 mil | 0.73 mil | 0.11 mil | 0.18 mil | 0.09 mil | 0.14 mil | 0.11 mil |

Film 63I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| ION | 70 SSPE5<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 64I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 70 SSPE6<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 65I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 70 SSPE7<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 66I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 55 VLDPE1<br>15 PLAS1<br>30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

Film 67I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 55 VLDPE1<br>15 PLAS1<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 68I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| ION | 70 SSPE5<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 69I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 55 VLDPE1<br>15 PLAS1<br>30 EVA1 | EVA-2 | PVDC1 | EVA-2 | mEVA | PET3 |
| 0.3 mil | 0.73 mil | 0.11 mil | 0.18 mil | 0.09 mil | 0.14 mil | 0.11 mil |

Film 70I (@200 kV) and Film 70I (@500 kV)

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 55 VLDPE1<br>15 PLAS1<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 71I (prophetic)

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 55 VLDPE1<br>15 PLAS1<br>30 EVA1 | EVA-2 | PVDC1 | EVA-2 | mEVA | 99 PETG5<br>1 MB2 |
| 0.3 mil | 0.73 mil | 0.11 mil | 0.18 mil | 0.09 mil | 0.14 mil | 0.11 mil |

Film 72I (prophetic)

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 70 SSPE5<br>30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

Film 73I (@200 kV) and 73I (@500 kV)

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 60 VLDPE1<br>10 EPDM<br>30 EVA1 | EVA-2 | PVDC1 | EVA-2 | mEVA | PETG5 |
| 0.3 mil | 0.73 mil | 0.11 mil | 0.18 mil | 0.09 mil | 0.14 mil | 0.11 mil |

Film 74I (prophetic)

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier Coating Section | Tie #2 | Tie #3 | Abuse |
| 80 SSPE1<br>20 LLDPE2 | 70 VLDPE1<br>30 EVA1 | EVA-2 | PVDC1 | EVA-2 | mEVA | coPET1 |
| 0.3 mil | 0.73 mil | 0.11 mil | 0.18 mil | 0.09 mil | 0.14 mil | 0.11 mil |

Film 75I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 85 VLDPE1 15 EVA5 | EVA-1 | PVDC1 | EVA-1 | mEVA | coPET1 |
| 0.31 mil | 0.72 mil | 0.11 mil | 0.18 mil | 0.09 mil | 0.24 mil | 0.11 mil |

Film 76I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 78 VLDPE1 22 EVA5 | EVA-1 | PVDC1 | EVA-1 | mEVA | coPET1 |
| 0.31 mil | 0.72 mil | 0.11 mil | 0.18 mil | 0.09 mil | 0.24 mil | 0.11 mil |

Film 77

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 60 VLDPE1 10 PLAS1 30 EVA-1 | EVA-1 | PVDC1 | EVA-1 | mEVA | coPET1 |
| 0.32 mil | 1.03 mil | 0.17 mil | 0.08 mil | 0.21 mil | 0.12 mil | 0.00 mil |

Film 78I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 65 VLDPE1 5 PLAS1 30 EVA-1 | EVA-1 | PVDC1 | EVA-1 | mEVA | coPET1 |
| 0.32 mil | 1.03 mil | 0.17 mil | 0.08 mil | 0.21 mil | 0.12 mil | 0.00 mil |

Film 79N

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 65 VLDPE1 5 PLAS1 30 EVA-1 | EVA-1 | PVDC1 | EVA-1 | mEVA | PETG6 |
| 0.32 mil | 1.03 mil | 0.17 mil | 0.08 mil | 0.21 mil | 0.12 mil | 0.00 mil |

Film 80N

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 55 VLDPE1 15 PLAS1 30 EVA-1 | EVA-1 | PVDC1 | EVA-1 | mEVA | PETG6 |
| 0.27 mil | 1.03 mil | 0.09 mil | 0.16 mil | 0.08 mil | 0.20 mil | 0.09 mil |

Film 81N

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 55 SSPE7 15 PLAS1 30 EVA-1 | EVA-2 | PVDC1 | EVA-2 | mEVA | PET3 |
| 0.32 mil | 1.03 mil | 0.17 mil | 0.08 mil | 0.21 mil | 0.12 mil | 0.00 mil |

Film 82N

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 55 VLDPE1 15 PLAS1 30 EVA-1 | EVA-2 | PVDC1 | EVA-2 | mEVA | PET3 |
| 0.30 mil | 0.73 mil | 0.11 mil | 0.18 mil | 0.09 mil | 0.14 mil | 0.11 mil |

Film 83

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| 80 SSPE1 20 LLDPE2 | 55 VLDPE1 15 PLAS2 30 EVA-1 | EVA-1 | PVDC1 | EVA-1 | mEVA | PETG5 |
| 0.27 mil | 1.03 mil | 0.09 mil | 0.16 mil | 0.08 mil | 0.20 mil | 0.09 mil |

Film 84I

| Layer 1 | Layer 2 | Layer 3 | Layer 4 | Layer 5 | Layer 6 | Layer 7 |
|---|---|---|---|---|---|---|
| Sealant Substrate | Core Section | Tie #1 | Barrier | Tie #2 Coating Section | Tie #3 | Abuse |
| ION | 70 VLDPE2 30 EVA-1 | EVA-2 | PVDC1 | EVA-2 | mEVA | coPET1 |
| 0.31 mil | 0.73 mil | 0.09 mil | 0.19 mil | 0.09 mil | 0.11 mil | 0.12 mil |

Film 85N

| Layer 1 | Layer 2 | Layer 3 | Layer 4 | Layer 5 | Layer 6 |
|---|---|---|---|---|---|
| Sealant Substrate | Core Section | Tie #1 | Barrier | Tie #2 | outer |
| 80 SSPE1 20 LLDPE2 | 70 VLDPE1 30 EVA-1 | EVA-2 | PVDC2 | EVA-2 | mEVA |
| 0.32 mil | 1.03 mil | 0.17 mil | 0.08 mil | 0.21 mil | 0.12 mil |

| Film 86I | | | | | |
|---|---|---|---|---|---|
| Layer 1 | Layer 2 | Layer 3 | Layer 4 | Layer 5 | Layer 6 |
| Sealant Substrate | Core Section | Tie #1 | Barrier | Tie #2 | outer |
| ION | 70 VLDPE1 30 EVA-1 | EVA-2 | PVDC2 | EVA-2 | mEVA |
| 0.32 mil | 1.03 mil | 0.17 mil | 0.08 mil | 0.21 mil | 0.12 mil |

| Film 87N | | | | | |
|---|---|---|---|---|---|
| Layer 1 | Layer 2 | Layer 3 | Layer 4 | Layer 5 | Layer 6 |
| Sealant Substrate | Core Section | Tie #1 | Barrier | Tie #2 | outer |
| 80 SSPE1 20 LLDPE2 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

| Film 88N | | | | | |
|---|---|---|---|---|---|
| Layer 1 | Layer 2 | Layer 3 | Layer 4 | Layer 5 | Layer 6 |
| Sealant Substrate | Core Section | Tie #1 | Barrier | Tie #2 | outer |
| 60 SSPE1 20 LLDPE2 20 MB3 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

| Film 89N | | | | | |
|---|---|---|---|---|---|
| Layer 1 | Layer 2 | Layer 3 | Layer 4 | Layer 5 | Layer 6 |
| Sealant Substrate | Core Section | Tie #1 | Barrier | Tie #2 | outer |
| 60 SSPE1 20 LLDPE2 20 MB3 | 70 VLDPE2 30 EVA-1 | EVA-2 | PVDC2 | EVA-2 | mEVA |
| 0.32 mil | 1.03 mil | 0.17 mil | 0.08 mil | 0.21 mil | 0.12 mil |

| Film 90I | | | | | | |
|---|---|---|---|---|---|---|
| Layer 1 | Layer 2 | Layer 3 | Layer 4 | Layer 5 | Layer 6 | Layer 7 |
| Sealant Substrate | Core Section | Tie #1 | Barrier | Tie #2 | Tie #3 Coating Section | Abuse |
| 80 SSPE1 20 LLDPE2 | 70 VLDPE1 30 EVA1 | EVA 2 | PVDC1 | EVA 2 | EVA 3 | EPC |
| 0.3 mil | 0.83 mil | 0.11 mil | 0.21 mil | 0.11 mil | 0.13 mil | 0.14 mil |

Results of various tests on the films and packages were made, with the results set forth in Table 2, below. These tests included free shrink, instrumented impact energy-to-break, instrumented impact peak load, Truburst, post-shrink haze, and drop testing. The tests were carried out in accordance with the ASTM tests described above. In addition, Drop & Simulated Distribution Testing was conducted as described below.

Drop & Simulated Distribution Test

Fresh halves of beef bottom rounds (total of 21 samples) were packaged in a test material or control bag. Bags were sealed and vacuumized on a rotary vacuum chamber machine as disclosed in U.S. Pat. No. 6,499,274 to McDonald et al, which is hereby incorporated, in its entirety, by reference thereto.

A single seal wire was used, with the seal being made by running a current of from 68-72 amps for a time of 0.53 seconds with a sealing pressure of 15.

Packages were shrunk using a shrink tunnel at a water temperature of approximately 85° C. The packages were in the shrink tunnel for about 1-3 seconds.

Packages were inspected for complete seals and ensure they were hermetic before being placed in a cardboard box. Each box contained one product from each formulation plus the control. Each box was individually dropped one time from a height of 36 inches using a LANSMONT drop tester machine (Model "Field to Lab" #S/N M-15764). Approximately 15 minutes after being dropped, packages were checked for failures. Leaking packages were marked for later failure mode identification.

Using fresh packages and boxes, for films 1I, 59I, 66I, and 70I, additional or alternative drop testing was carried out in the same manner except that the drop was conducted from a height of 30 inches using the same LANSMONT drop testing machine, with the packages being checked for failure using the same procedure described above for the 36" drop.

Boxes of dropped products were resealed (without removing the packages broken during the Drop Testing) and secured on a shaker table for a Distribution Simulation Test, using a LANSMONT Vibration System. The Simulated Distribution Test was conducted in accordance with ASTM D4169, which is hereby incorporated, in its entirety, by reference thereto. The Simulated Distribution Test was conducted at Truck level II for one hour. At the conclusion of the Simulated Distribution Testing, the boxes were re-opened and the packages reevaluated for failures. The modes of failure were recorded following the end of the Simulated Distribution Test. After testing was competed and failure modes identified, the products were repackaged in a new package made from a different film, the packaging occurring under the same and conditions as described previously. The repackaged products were placed in a freezer at −20° F. for 45 minutes prior to the next round of testing.

In conducting the drop testing using films having a total free shrink of ≥90% @85 C, it was found that sealing the bag closed with the usual product-to-seal distance of about 4 centimeters resulted in seals that were extremely close and tight to the product once the film was shrunk. When these tight packages were dropped at a height of 36", it was found that the hydraulic pressure created seal and bag failures at the applied seal area. The predominate failure modes seen after drop testing were bag ripping at applied seal and applied seal failures, majority of failures were seen after drop testing. Edge tearing became apparent when materials were sealed at ≥73 amps at 530 msec.

The results for the combined Drop Test & Simulated Distribution Test Drop for packages made from Films 1I, 1N, 2I, 2N, 52N, 58I, 58N, 59I, 66I, 69I, 70I, 84I, and 86I are provided in Table 2 below. Lowering the seal pressure did not lower the percentage of failures in the drop testing.

TABLE 2

| Film No | 3-comp blend (wt %, total film basis) | Plastomer (wt %, total blend weight basis) | IRR (kGy) | Total Free Shrink (L + T) @ 85° C. | Inst. Impact energy to break (J/mil) | Inst. Impact peal load (N/mil) | Tru-burst (psi/mil) | Post shrink haze (%) | Drop Test + distrib Test (% fail @ 36"/30") |
|---|---|---|---|---|---|---|---|---|---|
| 1I | 44 | 15 | 64 | 97 | 0.87 | 82.5 | 10.2 | | 24/8 |
| 1N | 44 | 15 | 0 | 97 | 0.62 | 63.9 | 7.8 | | 19/— |
| 2I | 0 | 0 | 64 | 82 | 0.68 | 76.2 | 10.1 | | 33/— |
| 2N | 0 | 0 | 0 | 82 | 0.42 | 56.6 | 7.0 | | 33/— |
| 3I | 0 | 0 | 64 | 94 | | | | | |
| 3N | 0 | 0 | 0 | 99 | | | | | |
| 4I | 0 | 0 | 64 | 98 | | | | | |
| 4N | 0 | 0 | 0 | 92 | | | | | |
| 5I | 0 | 0 | 64 | 98 | | | | | |
| 5N | 0 | 0 | 0 | | | | | | |
| 6I | 0 | 0 | 64 | | | | | | |
| 6N | 0 | 0 | 0 | | | | | | |
| 7I | 0 | 0 | 64 | | | | | | |
| 7N | 0 | 0 | 0 | | | | | | |
| 8I | 0 | 0 | 64 | 99 | | | | | |
| 8N | 0 | 0 | 0 | | | | | | |
| 9I | 44 | 15 | 64 | 98 | | 82.5 | 10.2 | | |
| 9N | 44 | 15 | 0 | 100 | | 63.9 | 7.8 | | |
| 10I | 44 | 15 | 64 | | | | | | |
| 10N | 44 | 15 | 0 | | | | | | |
| 11N | 43.1 | 15 | 0 | | | | | | |
| 12N | 43.1 | 15 | 0 | 99 | | | 6.3 | | |
| 13N | 0 | 0 | 0 | | | | | | |
| 14N | 43.1 | 15 | 0 | | | | | | |
| 15N | 43.1 | 30 | 0 | | | | | | |
| 16N | 43.1 | 15 | 0 | | | | | | |
| 17N | 43.1 | 15 | 0 | 81.5 | | | 7.2 | | |
| 20N | 43.1 | 15 | 0 | | | | | | |
| 21N | 43.1 | 15 | 0 | 94.5 | | | 7.9 | | |
| 22N | 43.1 | 15 | 0 | | | | | | |
| 23N | 43.1 | 15 | 0 | | | | | | |
| 24I | 44 | 15 | 64 | 92.5 | | 75.4 | 9.2 | | |
| 24IH | 44 | 15 | 64 | 94.5 | | 78.9 | 9.9 | | |
| 24NT | 44 | 15 | 64 | 93.5 | | 61.3 | 7.3 | | |
| 24NH | 44 | 15 | 0 | 97 | | 69.6 | 7.4 | | |
| 25 | | | | | | | | | |
| 25IT | 44 | 15 | 64 | 99 | | 76.1 | 10.2 | | |
| 25IH | 44 | 15 | 64 | 98 | | 93.7 | 10.2 | | |
| 25NT | 44 | 15 | 0 | 92 | | 58.1 | 7.6 | | |
| 25NH | 44 | 15 | 0 | 90 | | 59.4 | 7.5 | | |
| 26I | 44 | 15 | 64 | 94 | | | | | |
| 27I | 44 | 15 | 64 | 84.5 | | 60.5 | 7.5 | | |
| 28I | 0 | 3.6 | 64 | 92 | | 93.4 | 9.9 | | |
| 28N | 0 | 3.6 | 0 | | | | | | |
| 29 | 0 | | | | | | | | |
| 29IT | 0 | 0 | 64 | | | | 10.7 | | |
| 29IH | 0 | 0 | 64 | 95 | | 97.9 | 11.4 | | |
| 29NT | 0 | 0 | 0 | 96 | | 58.1 | 8.7 | | |
| 29NH | 0 | 0 | 0 | 88 | | 78.9 | 8.7 | | |
| 30I | 44 | 15 | 64 | 96 | | | 10.6 | | |
| 31I | 44 | 15 | N/P | N/P | N/P | N/P | N/P | | |
| 32I | 44 | 15 | 64 | | | | | | |
| 33I | 44 | 15 | 64 | 96 | | 78.9 | 9.9 | | |
| 34N | 45 | 15 | 0 | 93 | | | | | |
| 35 | 0 | 0 | | | | | | | |
| 35IT | 0 | 0 | 64 | 88.5% | | 95.4 | 10.6 | | |
| 35IH | 0 | 0 | 64 | 92% | | 100.3 | 11.0 | | |
| 35NT | 0 | 0 | 0 | 86% | | 70.2 | 8.6 | | |
| 35NH | 0 | 0 | 0 | 89% | | 76.0 | 8.8 | | |
| 36I | 44 | 15 | 64 | | | | | | |
| 37I | 44 | 15 | 64 | 91% | | | 9.6 | | |
| 38I | 44 | 10 | 64 | 86 | | | 9.0 | | |
| 39I | 44 | 15 | 64 | 81 | | | 8.3 | | |
| 40I | 44 | 15 | 64 | | | | | | |
| 41I | 44 | 15 | 64 | 85 | | | 8.9 | | |
| 42I | 44 | 10 | 64 | | | | | | |
| 43N | 43.1 | 15 | 0 | | | | | | |
| 44N | 43.1 | 15 | 0 | | | | | | |
| 45N | 43.1 | 15 | 0 | | | | | | |
| 46N | 43.1 | 15 | 0 | | | | | | |
| 47N | 0 | 0 | 0 | | | | | | |
| 48N | 43.1 | 15 | 0 | | | | | | |
| 49N | 43.1 | 15 | 0 | | | | | | |
| 50N | 43.1 | 15 | 0 | | | | | | |

TABLE 2-continued

| Film No | 3-comp blend (wt %, total film basis) | Plastomer (wt %, total blend weight basis) | IRR (kGy) | Total Free Shrink (L + T) @ 85° C. | Inst. Impact energy to break (J/mil) | Inst. Impact peal load (N/mil) | Tru-burst (psi/mil) | Post shrink haze (%) | Drop Test + distrib Test (% fail @ 36"/30") |
|---|---|---|---|---|---|---|---|---|---|
| 51N | 42.7 | 15 | 0 | | | | | | |
| 52N | 42.7 | 15 | 0 | 94 | | | 6.9 | | 52/— |
| 53N | 42.7 | 15 | 0 | | | | | | |
| 54N | 42.7 | 15 | 0 | | | | | | |
| 55N | 0 | 0 | 0 | 92% | | | 7.2 | | |
| 56N | 0 | 0 | 0 | 109% | | | 8.8 | | |
| 57N | 0 | 0 | 0 | | | | 7.2 | | |
| 58I | 0 | 0 | 0 | 80 | | | 9.4 | | 24/— |
| 58N | 0 | 0 | 0 | 79 | | | 8.1 | | 19/— |
| 59I | 44 | 15 | 64 | 93 | — | — | 7.3 | | 14/4 |
| 60I | 0 | 0 | 64 | | | | | | |
| 61I | 0 | 0 | 64 | 63 | | | 9.9 | | |
| 62I | 0 | 0 | 64 | | | | | | |
| 63I | 0 | 0 | 64 | | | | | | |
| 64I | 0 | 0 | 64 | | | | | | |
| 65I | 0 | 0 | 64 | | | | | | |
| 66I | 44 | 15 | 64 | 98 | 0.65 | 74.1 | 8.9 | 58 | 25/4 |
| 67I | 44 | 15 | 64 | 95 | | | | | |
| 68I | 0 | 0 | 64 | | | | | | |
| 69I | 44 | 15 | 64 | 103 | 0.70 | 81.9 | 10.3 | 56 | 46/— |
| 70I | 44 | 15 | 200 kV 500 kV | | | | | | —/4 |
| 71I | 44 | 15 | 64 | N/P | N/P | N/P | N/P | N/P | N/P |
| 72I | 0 | 0 | 64 | N/P | N/P | N/P | N/P | N/P | N/P |
| 73I | 0 | 0 | 200 kV 500 kV | | | | | | |
| 74I | 0 | 0 | 64 | N/P | N/P | N/P | N/P | N/P | N/P |
| 75I | 0 | 0 | 64 | 89 | | — | 10.6 | | |
| 75N | 0 | 0 | 0 | 89 | | — | 8.6 | | |
| 76I | 0 | 0 | 64 | 84 | 0.66 | 76.1 | 9.3 | | |
| 77N | 53.4 | 10 | 0 | | | | | | |
| 78N | 53.4 | 5 | 0 | | | | | | |
| 79N | 53.4 | 5 | 0 | | | | | | |
| 80N | 53.6 | 15 | 0 | | | | | | |
| 81N | 53.6 | 15 | 0 | 78 | | | 8.5 | | |
| 82N | 44 | 15 | 0 | | | | | | |
| 83N | 44 | 15 | 0 | | | | | | |
| 84I | 0 | 0 | 0 | 103 | | — | 9.2 | | 29/— |
| 85N | 0 | 0 | 0 | 94 | | — | 8.0 | | |
| 86N | 0 | 0 | 0 | 101 | | — | 8.0 | | 25/— |
| 87N | 0 | 0 | 0 | 96 | | — | 6.7 | | |
| 88N | 0 | 0 | 0 | 89 | | | | | |
| 89N | 0 | 0 | 0 | | | | | | |
| 90I | 0 | 0 | 64 | | | | | | |

Results of Testing

Of the seven films tested for both total free shrink and instrumented impact energy-to-break, only Films 1I, 66I, and 69I exhibited both a total free shrink @85° C. of at least 90% and instrumented impact energy-to-break of at least 0.65 Joules/mil. Of the twenty seven films tested for both total free shrink and instrumented impact peak load, only twelve films (i.e., Films 1I, 9I, 24I, 24IH, 25IT, 25IH, 28I, 29IH, 33I, 35IH, 66I, and 69I) exhibited both a total free shrink @85° C. of at least 90% and instrumented impact peak load of at least 70 Newtons/mil. Notably, each of the twelve films which met both the shrink criteria and the instrumented impact criteria had a substrate film portion which was irradiated at 64 kGy, producing a crosslinked polymer network in that portion of the film.

While all of the films of the examples were prepared by extrusion coating, only some had the substrate portion (the first film portion) irradiated at 64 kGy to make a crosslinked polymer network. All of the irradiated films had only the substrate portion irradiated, with the coating portion (the second film portion) not being irradiated. However, for both the irradiated films and the non-irradiated films, the substrate, and the coating thereover, were both reheated to their softening point (in hot water) and oriented in the solid state, with the solid state orientation producing stressed polymer networks in both the coating and the substrate. In Films 1I, 66I, 69I, and 76I, the result was a film of high total free shrink at relatively low temperature, and high instrumented impact energy-to-break per mil of film thickness.

In the twelve films (Films 1I, 9I, 24I, 24TH, 25IT, 25TH, 28I, 29TH, 33I, 35IH, 66I, and 69I) that exhibited both high free shrink at low temperature and high instrumented impact peak load, it was surprising that this combination of shrink and impact be obtained in films made almost exclusively of polyolefin-based polymers, with the exception of an outer polyester layer making up less than 7% of the total film thickness. None of the films contained polyamide. As all twelve films had a crosslinked polymer network in a portion of the film, the data supports the conclusion that the crosslinked polymer network contributed to the surprising combination of shrink and impact. Also, as nine of the twelve films contained plastomer, the data supports the conclusion that plastomer assists in achieving the combination of shrink and impact, but is not required in a polyolefin-based film having the combination of high shrink and high impact.

The four films tested for free shrink and energy to break that did not exhibit both a total free shrink @85° C. of at least 90% and instrumented impact energy-to-break of at least 0.65 Joules/mil were: (i) Film 1N (total free shrink 97%; instrumented impact energy to break 0.62 J/mil); (ii) Film 2I (total free shrink 82%; instrumented impact energy to break 0.68 J/mil); and (iii) Film 2N (total free shrink 64%; instrumented impact energy to break 0.42 J/mil); and (iv) Film 76I (total free shrink 84%; instrumented impact energy to break 0.66 J/mil). The fifteen films tested for free shrink and peak load that did not exhibit a total free shrink @85° C. of at least 90% and instrumented impact peak load of at least 70 Newtons/mil were: (#1) Film 1N (total free shrink 97%; instrumented impact peak load 63.9N/mil); (#2) Film 2I (total free shrink 82%; instrumented impact peak load 76.2 N/mil); (#3) Film 2N (total free shrink 82%; instrumented impact peak load 56.6 N/mil); (#4) Film 9N (total free shrink 100%; instrumented impact peak load 63.9 N/mil); (#5) Film 24NT (total free shrink 93.5%; instrumented impact peak load 63.1N/mil); (#6) Film 24NH (total free shrink 97%; instrumented impact peak load 69.6N/mil); (#7) Film 25NT (total free shrink of 92%; instrumented impact peak load 58.1N/mil); (#8) Film 25NH (total free shrink of 90%; instrumented impact peak load 59.41N/mil); (#9) Film 27I (total free shrink of 84.5%; instrumented impact peak load 60.5N/mil); (#10) Film 29NT (total free shrink of 96%; instrumented impact peak load 58.1N/mil); (#11) Film 29NH (total free shrink of 88%; instrumented impact peak load 78.9N/mil); (#12) Film 35IT (total free shrink of 88.5%; instrumented impact peak load 95.4N/mil); (#13) Film 35NT (total free shrink of 86%; instrumented impact peak load 70.2N/mil); (#14) Film 35NH (total free shrink of 89%; instrumented impact peak load 76.0N/mil); and (#15) Film 76I (total free shrink 84%; instrumented impact peak load 76.1N/mil).

Of the fifteen tested films which did not exhibit the combination of desired shrink and instrumented impact (either energy to break or peak load), eleven contained no crosslinked polymer network. Of the three films (Films 1I, 66I, and 69I) which had the combination of high total free shrink and high instrumented impact energy to break, all three were irradiated and all three contained about 6.6 wt % plastomer having a melt index of less than 1.1 g/10 min. Moreover, of the twelve films which exhibited the combination of high total free shrink and high instrumented impact peak load, nine contained about 6.6 wt % plastomer (total film wt basis) with melt index below 1.1 g/10 min, one contained 3.6 wt % plastomer, and two did not contain plastomer.

Thus, it can be concluded from the data that the presence of the crosslinked polymer network was required to obtain the combination of high shrink and high impact strength, and that the plastomer assisted, but was not required, in order to achieve the combination of high shrink and high impact.

Various and additional embodiments of the disclosed subject matter are described and recited in the following sentences A through AAAAA.

A. A multilayer, heat-shrinkable film comprises a first film portion laminated to a second film portion, wherein: A) the first film portion comprises a first layer which is a first outer layer and which is a heat-seal layer, the first film portion comprising a cross-linked polymer network which has been strained by solid-state orientation; B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion does not contain a crosslinked polymer network; wherein the multilayer, heat-shrinkable film has a total free shrink at 85° C. of at least 90% measured in accordance with ASTM D2732, and an instrumented impact energy-to-break of at least 0.65 J/mil, measured in accordance with ASTM D3763, with the film comprising 0 wt % polyamide or polyamide in an amount of less than 10 wt %, on a total film weight basis.

B. The multilayer, heat-shrinkable film of sentence A, wherein the polyester in the second outer layer makes up from 2 to 20 wt % based on total film weight, and the polyvinylidene chloride in the oxygen barrier layer makes up from 2 to 20 wt % based on total film weight, and the film further comprises an ethylene-based polymer having a peak melting point ≥95° C. and at least one ethylene/unsaturated ester copolymer, the ethylene-based polymer making up from 30 to 80 wt %, based on total film weight, and the ethylene/unsaturated ester making up from 10 to 55 wt %, based on total film weight.

C. The multilayer, heat-shrinkable film of sentence A, wherein the polyester in the second outer layer makes up from 2 to 10 wt % based on total film weight, and the polyvinylidene chloride in the oxygen barrier layer makes up from 5 to 15 wt % based on total film weight, and the film further comprises an ethylene-based polymer having a peak melting point ≥95° C. and at least one ethylene/unsaturated ester copolymer, the ethylene-based polymer making up from 40 to 70 wt %, based on total film weight, and the ethylene/unsaturated ester making up from 25 to 45 wt %, based on total film weight.

D. The multilayer, heat-shrinkable film of sentence A, wherein the polyester in the second outer layer makes up from 4 to 8 wt % based on total film weight, and the polyvinylidene chloride in the oxygen barrier layer makes up from 5 to 15 wt % based on total film weight, and the film further comprises an ethylene-based polymer having a peak melting point ≥95° C. and at least one ethylene/unsaturated ester copolymer, the ethylene-based polymer making up from 45 to 65 wt %, based on total film weight, and the ethylene/unsaturated ester making up from 30 to 40 wt %, based on total film weight, and the film does not comprise polyamide.

E. The multilayer, heat-shrinkable film of sentence A, wherein the first film portion comprises an ethylene-based polymer having a peak melting point ≥95° C. and an ethylene/unsaturated ester copolymer, the ethylene-based polymer making up from 60 to 95 wt %, based on weight of the first film portion, and the ethylene/unsaturated ester making up from 5 to 40 wt %, based on weight of first film portion.

F. The multilayer, heat-shrinkable film of sentence A, wherein the first film portion comprises an ethylene-based polymer having a peak melting point ≥95° C. and an ethylene/unsaturated ester copolymer, the ethylene-based polymer making up from 70 to 95 wt %, based on weight of the first film portion, and the ethylene/unsaturated ester making up from 5 to 30 wt %, based on weight of first film portion.

G. The multilayer, heat-shrinkable film of sentence A, wherein the first film portion comprises an ethylene-based polymer having a peak melting point ≥95° C. and an ethylene/unsaturated ester copolymer, the ethylene-based polymer making up from 80 to 90 wt %, based on weight of the first film portion, and the ethylene/unsaturated ester making up from 10 to 20 wt %, based on weight of first film portion, and the film does not comprise polyamide.

H. The multilayer, heat-shrinkable film of sentence A, wherein the polyester in the second outer layer makes up from 2 to 20 wt %, based on total film weight; the polyvinylidene chloride in the oxygen barrier layer makes up from 2 to 20 wt %, based on total film weight; the film further comprises an ethylene-based polymer having a peak melting point ≥95° C., the ethylene-based polymer making up from 30 to 80 wt %, based on total film weight, and from 60 to 95 wt % based on weight of the first film portion; and the film further comprising at least one ethylene/unsaturated ester copolymer, the ethylene/unsaturated ester making up from 10 to 55 wt %, based on total film weight the ethylene/unsaturated ester making up from 5 to 40 wt %, based on weight of first film portion.

I. The multilayer, heat-shrinkable film of sentence A, wherein the polyester in the second outer layer makes up from 2 to 10 wt %, based on total film weight; the polyvinylidene chloride in the oxygen barrier layer makes up from 5 to 15 wt %, based on total film weight; the film further comprises an ethylene-based polymer having a peak melting point ≥95° C., the ethylene-based polymer making up from 40 to 70 wt %, based on total film weight, and from 70 to 95 wt % based on weight of the first film portion; and the film further comprising at least one ethylene/unsaturated ester copolymer, the ethylene/unsaturated ester making up from 25 to 45 wt %, based on total film weight the ethylene/unsaturated ester making up from 5 to 30 wt %, based on weight of first film portion.

J. The multilayer, heat-shrinkable film of sentence A, wherein: the polyester in the second outer layer makes up from 4 to 8 wt %, based on total film weight; the polyvinylidene chloride in the oxygen barrier layer makes up from 5 to 15 wt % based on total film weight; the film further comprises an ethylene-based polymer having a peak melting point ≥95° C., the ethylene-based polymer making up from 45 to 65 wt %, based on total film weight, and from 80 to 90 wt %, based on weight of the first film portion, and the film further comprising an ethylene/unsaturated ester making up from 30 to 40 wt %, based on total film weight, the ethylene/unsaturated ester making up from 10 to 20 wt %, based on weight of first film portion.

K. The multilayer, heat-shrinkable film of sentence A, wherein the polyester in the second outer layer makes up 6 wt %, based on total film weight; the polyvinylidene chloride in the oxygen barrier layer makes up 10 wt %, based on total film weight; and the film further comprises an ethylene-based polymer having a peak melting point ≥95° C. and at least one ethylene/unsaturated ester copolymer, the ethylene-based polymer making up 50 wt %, based on total film weight, and the ethylene/unsaturated ester making up 34 wt %, based on total film weight, and the film does not comprise polyamide.

L. The multilayer, heat-shrinkable film of sentence K, wherein the ethylene-based polymer is present in the first film portion in an amount of 85 wt %, based on weight of the first film portion, and the ethylene/unsaturated ester is present in the first film portion in an amount of 15 wt %, based on weight of first film portion.

M. The multilayer, heat-shrinkable film of sentence A, wherein the first film portion comprises an ethylene-based polymer having a peak melting point ≥95° C. and an ethylene/unsaturated ester copolymer, the ethylene-based polymer making up 85 wt %, based on weight of the first film portion, and the ethylene/unsaturated ester making up 15 wt %, based on weight of first film portion, and the film does not comprise polyamide.

N. The multilayer, heat-shrinkable film of any one of sentences A to M, wherein the heat seal layer comprises a blend of a homogeneous ethylene/alpha-olefin copolymer and a heterogeneous ethylene/alpha-olefin copolymer.

O. The multilayer, heat-shrinkable film of sentence N, wherein the homogeneous ethylene/alpha-olefin copolymer is present in the heat seal layer in an amount of from 60 to 95 wt %, based on layer weight, and the heterogeneous ethylene/alpha-olefin copolymer is present in the heat seal layer in an amount of from 5 to 40 wt %, based on layer weight.

P. The multilayer, heat-shrinkable film of sentence N, wherein the homogeneous ethylene/alpha-olefin copolymer is present in the heat seal layer in an amount of from 70 to 90 wt %, based on layer weight, and the heterogeneous ethylene/alpha-olefin copolymer is present in the heat seal layer in an amount of from 10 to 30 wt %, based on layer weight.

Q. The multilayer, heat-shrinkable film of sentence N, wherein the homogeneous ethylene/alpha-olefin copolymer is present in the heat seal layer in an amount of from 75 to 85 wt %, based on layer weight, and the heterogeneous ethylene/alpha-olefin copolymer is present in the heat seal layer in an amount of from 15 to 25 wt %, based on layer weight.

R. The multilayer, heat-shrinkable film of sentence N, wherein the homogeneous ethylene/alpha-olefin copolymer is present in the heat seal layer in an amount of 80 wt %, based on layer weight, and the heterogeneous ethylene/alpha-olefin copolymer is present in the heat seal layer in an amount of 20 wt %, based on layer weight.

S. The multilayer, heat-shrinkable film according to any of Claims N to R, wherein the heterogeneous ethylene/alpha-olefin comprises at least one member selected from the group consisting of linear low density polyethylene and very low density polyethylene.

T. The multilayer, heat-shrinkable film of any one of sentences A to S, wherein the film further comprises a core layer in the first film portion, the core layer being between the heat seal layer and the oxygen barrier layer, the core layer comprising a blend of ethylene/unsaturated ester copolymer and at least one member selected from the group consisting of very low density polyethylene, ultra low density polyethylene, and homogeneous ethylene/alpha-olefin copolymer having a peak melting point of at least 95° C.

U. The heat-shrinkable film of any one of sentences A to T, further comprising:

a first tie layer between the oxygen barrier layer and the heat seal layer, with the first tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer; and a second tie layer between the oxygen barrier layer and the second outer layer comprising polyester, the second tie layer comprising at least one member selected from the group consisting of anhydride-functional polyolefin, anhydride-functional ethylene/unsaturated acid copolymer, anhydride-functional ethylene/unsaturated ester copolymer, cyclic olefin copolymer, acrylate-based polymer, polyurethane, styrene-based polymer.

V. The heat-shrinkable film of any one of sentences A to T, further comprising:

a first tie layer between the oxygen barrier layer and the core layer, with the first tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer; and a second tie layer between the oxygen barrier layer and the second outer layer comprising polyester, the second tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer.

W. The heat-shrinkable film of sentence V, further comprising a third tie layer between the second tie layer and the second outer layer comprising polyester, the third tie layer comprising at least one member selected from the group consisting of anhydride-functional polyolefin, anhydride-functional ethylene/unsaturated acid copolymer, anhydride-functional ethylene/unsaturated ester copolymer, cyclic olefin copolymer, acrylate-based polymer, polyurethane, styrene-based polymer.

X. The heat-shrinkable film of any one of sentences T to W, wherein the crosslinked polymer network is present in the heat seal layer and the core layer, but the crosslinked polymer network is not present in the barrier layer, the second outer layer, and the first and second tie layers.

Y. The multilayer, heat-shrinkable film of any one of sentences A to X, wherein the multilayer film further comprises a plastomer having a peak melting point ≤90° C. and a melt index of ≤1.1 g/10 min.

Z. The multilayer, heat-shrinkable film of sentence Y, wherein the plastomer has a peak melting point ≤88° C.

AA. The heat-shrinkable film of sentence Y, wherein the plastomer has a peak melting point ≤85° C.

AB. The heat-shrinkable film of sentence Y, wherein the plastomer has a peak melting point ≤82° C.

AC. The heat-shrinkable film of sentence Y, wherein the plastomer has a peak melting point ≤80° C.

AD. The heat-shrinkable film of sentence Y, wherein the plastomer has a peak melting point of from 45° C. to 90° C.

AE. The heat-shrinkable film of sentence Y, wherein the plastomer has a peak melting point of from 50° C. to 85° C.

AF. The heat-shrinkable film of sentence Y, wherein the plastomer has a peak melting point of from 55° C. to 85° C.

AG. The heat-shrinkable film of sentence Y, wherein the plastomer has a peak melting point of from 45° C. to 80° C.

AH. The heat-shrinkable film of sentence Y, wherein the plastomer has a density ≤0.908 g/cc$^3$.

AI. The heat-shrinkable film of sentence Y, wherein the plastomer has a density ≤0.905 g/cc$^3$.

AJ. The heat-shrinkable film of sentence Y, wherein the plastomer has a density ≤0.902 g/cc$^3$.

AK. The heat-shrinkable film of sentence Y, wherein the plastomer has a density ≤0.900 g/cc$^3$.

AL. The heat-shrinkable film of sentence Y, wherein the plastomer has a density ≤0.895 g/cc$^3$.

AM. The heat-shrinkable film of sentence Y, wherein the plastomer has a density ≤0.890 g/cc$^3$.

AN. The heat-shrinkable film of any one of sentences Y to AM, wherein the plastomer is present in the film in an amount of at least 2 wt %, based on total film weight.

AO. The heat-shrinkable film of any one of sentences Y to AM, wherein the plastomer is present in the film in an amount of at least 4 wt %, based on total film weight.

AP. The heat-shrinkable film of any one of sentences Y to AM, wherein the plastomer is present in the film in an amount of from 2 to 20 wt %, based on total film weight.

AQ. The heat-shrinkable film of any one of sentences Y to AM, wherein the plastomer is present in the film in an amount of from 3 to 15 wt %, based on total film weight.

AR. The heat-shrinkable film of any one of sentences Y to AM, wherein the plastomer is present in the film in an amount of from 3 to 10 wt %, based on total film weight.

AS. The heat-shrinkable film of any one of sentences Y to AM, wherein the plastomer is present in the film in an amount of from 4 to 8 wt %, based on total film weight.

AT. The heat-shrinkable film of any one of sentences Y to AM, wherein the plastomer is present in the film in an amount of from 5 to 7 wt %, based on total film weight.

AU. The multilayer, heat-shrinkable film of any one of sentences Y to AM, wherein the plastomer is present in the seal layer.

AV. The multilayer, heat-shrinkable film of any one of sentences A to AU, wherein the polyester comprises at least one member selected from the group consisting of polyethylene terephthalate, polycyclohexane dimethylene terephthalate, polycyclohexanedimethanol terephthalic acid, polybutylene terephthalate, polynaphthalene terephthalate, and polyethylene furanoate.

AW. The multilayer, heat-shrinkable film of sentence AV, wherein the polyester has a melting point of from 80° C. to 270° C.

AX. The multilayer, heat-shrinkable film of sentence AV, wherein the polyester has a melting point of from 240° C. to 270° C.

AY. The heat-shrinkable film of any one of sentences A to AX, wherein the crosslinked polymer network is present in every layer of the first film portion, and the crosslinked polymer network is not present in any layer of the second film portion.

AZ. The heat-shrinkable film of any one of sentences A to AY, wherein the film has a thickness of from 0.5 mil to 3 mils.

BA. The heat-shrinkable film of any one of sentences A to AY, wherein the film has a thickness of from 0.7 mil to 2.5 mils.

BB. The heat-shrinkable film of any one of sentences A to AY, wherein the film has a thickness of from 1 to 2 mils.

BC. The heat-shrinkable film of any one of sentences A to AY, wherein the film has a thickness of from 1.5 to 1.9 mils.

BD. The heat-shrinkable film of any one of sentences A to BC, wherein the multilayer film has a total free shrink at 85° C. of at least 95%.

BE. The heat-shrinkable film of any one of sentences A to BC, wherein the multilayer film has a total free shrink at 85° C. of at least 100%.

BF. The heat-shrinkable film of any one of sentences A to BC, wherein the multilayer film has a total free shrink at 85° C. of at least 105%.

BG. The heat-shrinkable film of any one of sentences A to BF, wherein the film has an instrumented impact energy-to-break ≥0.70 J/mil.

BH. The heat-shrinkable film of any one of sentences A to BF, wherein the film has an instrumented impact energy-to-break ≥0.75 J/mil.

BI. The heat-shrinkable film of any one of sentences A to BF, wherein the film has an instrumented impact energy-to-break ≥0.80 J/mil.

BJ. The heat-shrinkable film of any one of sentences A to BI, wherein the film contains polyamide in an amount less than 10 wt %.

BK. The heat-shrinkable film of any one of sentences A to BI, wherein the film contains polyamide in an amount less than 5 wt %.

BL. The heat-shrinkable film of any one of sentences A to BI, wherein the film does not contain polyamide.

BM. The heat-shrinkable film of any one of sentences A to BL, wherein the film loses less than 5% total free shrink at 85° C. after exposure to 100% relative humidity for 24 hours at 32° C.

BN. The heat-shrinkable film of any one of sentences A to BL, wherein the film loses less than 2% total free shrink at 85° C. after exposure to 100% relative humidity for 24 hours at 32° C.

BO. The heat-shrinkable film of any one of sentences A to BN, wherein the film contains polyester in an amount of from 1 to 40 wt %, based on total film weight.

BP. The heat-shrinkable film of any one of sentences A to BN, wherein the film contains polyester in an amount of from 1 to 35 wt %, based on total film weight.

BQ. The heat-shrinkable film of any one of sentences A to BN, wherein the film contains polyester in an amount of from 1 to 25 wt %, based on total film weight.

BR. The heat-shrinkable film of any one of sentences A to BN, wherein the film contains polyester in an amount of from 1 to 20 wt %, based on total film weight.

BS. The heat-shrinkable film of any one of sentences A to BN, wherein the film contains polyester in an amount of from 1 to 15 wt %, based on total film weight.

BT. The heat-shrinkable film of any one of sentences A to BN, wherein the film contains polyester in an amount of from 1 to 10 wt %, based on total film weight.

BU. A multilayer, heat-shrinkable film comprises a first film portion laminated to a second film portion, wherein:
A) the first film portion comprises a first layer which is a first outer layer and which is a heat-seal layer, the first film portion comprising a cross-linked polymer network which has been strained by solid-state orientation;
B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion not containing a crosslinked polymer network;
wherein the multilayer, heat-shrinkable film has a total free shrink at 85° C. of at least 90% measured in accordance with ASTM D2732, and an instrumented impact peak load strength of at least 70 Newtons/mil, measured in accordance with ASTM D3763, with the film comprising 0 wt % polyamide or polyamide in an amount of less than 10 wt %, on a total film weight basis.

BV. The heat-shrinkable film of sentence BU, wherein the instrumented impact peak load strength of the multilayer film is at least 78 Newtons/mil.

BW. The heat-shrinkable film of sentence BU, wherein the instrumented impact peak load strength of the multilayer film is at least 79 Newtons/mil.

BX. The heat-shrinkable film of sentence BU, wherein the instrumented impact peak load strength of the multilayer film is at least 80 Newtons/mil.

BY. The heat-shrinkable film of sentence BU, wherein the instrumented impact peak load strength of the multilayer film is at least 81 Newtons/mil.

BZ. A packaging article comprises a multilayer, heat-shrinkable film comprising a first film portion laminated to a second film portion, wherein:
A) the first film portion comprises a first layer which is a first outer layer and which is a heat-seal layer, the first film portion comprising a cross-linked polymer network which has been strained by solid-state orientation;
B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion not containing a crosslinked polymer network; and
wherein the multilayer, heat-shrinkable film has a total free shrink at 85° C. of at least 90% measured in accordance with ASTM D2732, and an instrumented impact energy-to-break of at least 0.65 J/mil, measured in accordance with ASTM D3763, with the film comprising 0 wt % polyamide or polyamide in an amount of less than 10 wt %, on a total film weight basis, and the film is heat sealed to itself.

CA. The packaging article of sentence BZ, wherein the packaging article is an end-seal bag having an open top, a bottom seal, a folded first side edge, and a folded second side edge.

CB. The packaging article of sentence BZ, wherein the packaging article is a side-seal bag having an open top, a folded bottom edge, a first side seal, and a second side seal.

CC. The packaging article of sentence BZ, wherein the packaging article is a pouch having a bottom seal, a first side seal, and a second side seal.

CD. The packaging article of sentence BZ, wherein the packaging article is a form-fill-seal packaging article having a fin seal running the length of the article, a first end seal at a first end of the article, and a second end seal at the second end of the article, with the form-fill-seal packaging article enclosing a product therein.

CE. The packaging article of sentence BZ to CD, wherein the packaging article has a patch adhered thereto, the patch comprising a patch film.

CF. A packaging article comprises a multilayer, heat-shrinkable film comprising a first film portion laminated to a second film portion, wherein:
A) the first film portion comprises a first layer which is a first outer layer and which is a heat-seal layer, the first film portion comprising a cross-linked polymer network which has been strained by solid-state orientation;
B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion not containing a crosslinked polymer network; and
wherein the multilayer, heat-shrinkable film has a total free shrink at 85° C. of at least 90% measured in accordance with ASTM D2732, and an instrumented impact peak load strength of at least 70 Newtons/mil, measured in accordance with ASTM D3763, with the film comprising 0 wt % polyamide or polyamide in an amount of less than 10 wt %, on a total film weight basis, and the film is heat sealed to itself.

CG. The packaging article of sentence CF, wherein the packaging article is an end-seal bag having an open top, a bottom seal, a folded first side edge, and a folded second side edge.

CH. The packaging article of sentence CF, wherein the packaging article is a side-seal bag having an open top, a folded bottom edge, a first side seal, and a second side seal.

CI. The packaging article of sentence CF, wherein the packaging article is a pouch having a bottom seal, a first side seal, and a second side seal.

CJ. The packaging article of sentence CF, wherein the packaging article is a form-fill-seal packaging article having a fin seal running the length of the article, a first end seal at a first end of the article, and a second end seal at the second end of the article, with the form-fill-seal packaging article enclosing a product therein.

CK. The packaging article of any one of sentences CF to CJ, wherein the packaging article has a patch adhered thereto, the patch comprising a patch film.

CL. A process for making a multilayer, heat-shrinkable film comprises:
A) extruding a first film portion comprising a first layer which is a first outer layer which is a heat-seal layer;
B) quenching the first film portion;
C) irradiating the first film portion so that a crosslinked polymer network is formed in the first film portion;
D) extrusion-coating a second film portion onto the first film portion after the first film portion has been irradiated, the extrusion-coating resulting in a laminate of the first and second film portions, the second film portion comprising (d)(i) a second layer which is a second outer layer and which comprises polyester, the second outer layer being to serve as an outside layer of the packaging article, and (d)(ii) a third layer which is an oxygen barrier layer comprising at least one member selected from the group consisting of polyvinylidene chloride, saponified ethylene/vinyl acetate copolymer, polyamide, polyester, polypropylene, ethylene homopolymer, polyethylene naphthalate, polytrimethylene terephthalate, liquid crystal polymer, and $O_2$-scavenger, the third layer being between the first layer and the second layer;
E) reheating the laminate to a temperature of from 88° C. to 100° C.;
F) biaxially orienting the laminate in the solid state, resulting in the multilayer, heat-shrinkable film; and
wherein the multilayer, heat-shrinkable film has a total free shrink at 85° C. of at least 90% measured in accordance with ASTM D2732, and an instrumented impact energy-to-break of at least 0.65 J/mil, measured in accordance with ASTM D3763, with the film comprising 0 wt % polyamide or polyamide in an amount of less than 10 wt %, on a total film weight basis.

CM. The process of sentence CL, wherein the first film portion is irradiated to a level of from 30 to 120 kGy.

CN. The process of any one of sentences CL to CM, wherein the oxygen barrier layer comprises polyvinylidene chloride.

CO. The process of any one of sentences CL to CN, wherein the first film portion is extruded from an annular extrusion die as a tubing and the second film portion is extruded over the tubing from an annular extrusion coating die, and the laminate is a tubular laminate.

CP. The process of sentence CO, wherein the biaxial orientation in the solid state is carried out by passing the tubular laminate over a trapped bubble while drawing the tubular laminate in the machine direction.

CQ. The process of any one of sentences CL to CN, wherein the first film portion is extruded from a first flat die as a sheet and the second film portion is extruded from a second flat die as a coating over the sheet and the laminate is a flat laminate.

CR. The process of sentence CQ, wherein the biaxial orientation in the solid state is carried out by drawing the flat laminate in a tenter frame.

CS. The process of any one of sentences CL to CR, wherein the laminate is biaxially oriented to a total orientation of from 10× to 16×.

What is claimed is:

1. A multilayer, heat-shrinkable film comprising a first film portion laminated to a second film portion, wherein:
    A) the first film portion comprises a first layer which is a first outer layer and which is a heat-seal layer comprising a blend of a homogeneous ethylene/alpha-olefin copolymer and a heterogeneous ethylene/alpha-olefin copolymer, the first film portion comprising a crosslinked polymer network which has been formed by irradiating the first film portion at 16 to 166 kGy and which has been strained by solid-state orientation;
    B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion does not contain a crosslinked polymer network;
wherein the multilayer, heat-shrinkable film has a total free shrink at 85° C. of at least 90% measured in accordance with ASTM D2732, and an instrumented impact energy-to-break of at least 0.65 J/mil, measured in accordance with ASTM D3763, with the film comprising polyamide in an amount of less than 10 wt %, on a total film weight basis.

2. The multilayer, heat-shrinkable film according to claim 1, wherein the polyester in the second outer layer makes up from 2 to 20 wt % based on total film weight, and the polyvinylidene chloride in the oxygen barrier layer makes up from 2 to 20 wt % based on total film weight, and the film further comprises an ethylene-based polymer having a peak melting point ≥95° C. and at least one ethylene/unsaturated ester copolymer, the ethylene-based polymer making up from 30 to 80 wt %, based on total film weight, and the ethylene/unsaturated ester making up from 10 to 55 wt %, based on total film weight.

3. The multilayer, heat-shrinkable film according to claim 1, wherein the polyester in the second outer layer makes up from 2 to 10 wt % based on total film weight, and the polyvinylidene chloride in the oxygen barrier layer makes up from 5 to 15 wt % based on total film weight, and the film further comprises an ethylene-based polymer having a peak melting point ≥95° C. and at least one ethylene/unsaturated ester copolymer, the ethylene-based polymer making up from 40 to 70 wt %, based on total film weight, and the ethylene/unsaturated ester making up from 25 to 45 wt %, based on total film weight.

4. The multilayer, heat-shrinkable film according to claim 1, wherein the homogeneous ethylene/alpha-olefin copolymer is present in the heat seal layer in an amount of from 60 to 95 wt %, based on layer weight, and the heterogeneous ethylene/alpha-olefin copolymer is present in the heat seal layer in an amount of from 5 to 40 wt %, based on layer weight.

5. The multilayer, heat-shrinkable film according to claim 1, wherein the film further comprises a core layer in the first film portion, the core layer being between the heat seal layer and the oxygen barrier layer, the core layer comprising a blend of ethylene/unsaturated ester copolymer and at least one member selected from the group consisting of very low density polyethylene, ultra low density polyethylene, and homogeneous ethylene/alpha-olefin copolymer having a peak melting point of at least 95° C.

6. The heat-shrinkable film according to claim 1, further comprising:
   a first tie layer between the oxygen barrier layer and the core layer, with the first tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer; and
   a second tie layer between the oxygen barrier layer and the second outer layer comprising polyester, the second tie layer comprising at least one member selected from the group consisting of an ethylene/carboxylic acid copolymer, an ethylene/ester copolymer, anhydride-modified ethylene/ester copolymer, and anhydride-modified ethylene/alpha-olefin copolymer; and
   a third tie layer between the second tie layer and the second outer layer comprising polyester, the third tie layer comprising at least one member selected from the group consisting of anhydride-functional polyolefin, anhydride-functional ethylene/unsaturated acid copolymer, anhydride-functional ethylene/unsaturated ester copolymer, cyclic olefin copolymer, acrylate-based polymer, polyurethane, styrene-based polymer.

7. The heat-shrinkable film according to claim 1, wherein the multilayer film has a total free shrink at 85° C. of at least 95%.

8. The heat-shrinkable film according to claim 1, wherein the film has an instrumented impact energy-to-break ≥0.70 J/mil, measured in accordance with ASTM D3763.

9. The heat-shrinkable film according to claim 1, wherein the film does not contain polyamide.

10. The heat-shrinkable film according to claim 1, wherein the film contains polyester in an amount of from 1 to 40 wt %, based on total film weight.

11. The multilayer, heat-shrinkable film according to claim 1, wherein the multilayer film further comprises a plastomer having a peak melting point ≤90° C. and a melt index of ≤1.1 g/10 min.

12. The heat-shrinkable film according to claim 11, wherein the plastomer has a peak melting point ≤82° C.

13. The heat-shrinkable film according to claim 11, wherein the plastomer has a density ≤0.908 g/cc³.

14. The heat-shrinkable film according to claim 11, wherein the plastomer is present in the film in an amount of at least 2 wt %, based on total film weight.

15. The multilayer, heat-shrinkable film according to claim 11, wherein the plastomer is present in the seal layer.

16. The multilayer, heat-shrinkable film according to claim 1, wherein the polyester comprises at least one member selected from the group consisting of polyethylene terephthalate, polycyclohexane dimethylene terephthalate, polycyclohexanedimethanol terephthalic acid, polybutylene terephthalate, polynaphthalene terephthalate, and polyethylene furanoate, and the polyester has a melting point of from 80° C. to 270° C.

17. The multilayer, heat-shrinkable film according to claim 16, wherein the polyester has a melting point of from 240° C. to 270° C.

18. A multilayer, heat-shrinkable film comprising a first film portion laminated to a second film portion, wherein:
   A) the first film portion comprises a first layer which is a first outer layer and which is a heat-seal layer comprising a blend of a homogeneous ethylene/alpha-olefin copolymer and a heterogeneous ethylene/alpha-olefin copolymer, the first film portion comprising a crosslinked polymer network which has been formed by irradiating the first film portion at 16 to 166 kGy and which has been strained by solid-state orientation;
   B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion not containing a crosslinked polymer network;
   wherein the multilayer, heat-shrinkable film has a total free shrink at 85° C. of at least 90% measured in accordance with ASTM D2732, and an instrumented impact peak load strength of at least 70 Newtons/mil, measured in accordance with ASTM D3763, with the film comprising polyamide in an amount of less than 10 wt %, on a total film weight basis.

19. A packaging article comprising a multilayer, heat-shrinkable film comprising a first film portion laminated to a second film portion, wherein:
   A) the first film portion comprises a first layer which is a first outer layer and which is a heat-seal layer comprising a blend of a homogeneous ethylene/alpha-olefin copolymer and a heterogeneous ethylene/alpha-olefin copolymer, the first film portion comprising a crosslinked polymer network which has been formed by irradiating the first film portion at 16 to 166 kGy and which has been strained by solid-state orientation;
   B) the second film portion comprises (b)(i) a second layer which is a second outer layer and which comprises polyester, and (b)(ii) a third layer which is an oxygen barrier layer comprising polyvinylidene chloride, the third layer being between the first layer and the second layer, the third layer having no crosslinked-polymer network, the second film portion having a polymer network which has been strained by solid state orientation, but the second film portion not containing a crosslinked polymer network;
   wherein the multilayer, heat-shrinkable film has a total free shrink at 85° C. of at least 90% measured in accordance with ASTM D2732, and an instrumented impact energy-to-break of at least 0.65 J/mil, measured in accordance with ASTM D3763, with the film comprising polyamide in an amount of less than 10 wt %, on a total film weight basis, and the film is heat sealed to itself.

* * * * *